US010750366B1

(12) United States Patent
Gundavelli et al.

(10) Patent No.: US 10,750,366 B1
(45) Date of Patent: Aug. 18, 2020

(54) EFFICIENT AUTHENTICATION AND SECURE COMMUNICATIONS IN PRIVATE COMMUNICATION SYSTEMS HAVING NON-3GPP AND 3GPP ACCESS

(71) Applicant: Cisco Technology, Inc., San Jose, CA (US)

(72) Inventors: Srinath Gundavelli, San Jose, CA (US); Indermeet Singh Gandhi, Bangalore (IN); Bart A. Brinckman, Nevele (BE); John Martin Graybeal, Califon, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/720,109

(22) Filed: Dec. 19, 2019

(51) Int. Cl.
*H04W 12/06* (2009.01)
*H04W 12/04* (2009.01)
(Continued)

(52) U.S. Cl.
CPC ....... *H04W 12/0609* (2019.01); *H04L 9/0844* (2013.01); *H04W 12/0017* (2019.01);
(Continued)

(58) Field of Classification Search
CPC ............. H04W 12/0609; H04W 60/04; H04W 12/0017; H04W 12/0401; H04W 12/1006; H04W 84/042; H04L 9/0844
See application file for complete search history.

(56) References Cited

U.S. PATENT DOCUMENTS 8,051,472 B2   11/2011   Maes
9,219,816 B2   12/2015   Grayson
(Continued)

FOREIGN PATENT DOCUMENTS

EP   2139260 A1   12/2009

OTHER PUBLICATIONS

Prasanna Sahu, "LTE Security Architecture", 3GLTE Info, Mar. 25, 2011, 10 pages.
(Continued)

*Primary Examiner* — Marisol Figueroa
(74) *Attorney, Agent, or Firm* — Edell, Shapiro & Finnan, LLC

(57) ABSTRACT

A user equipment (UE) may be in coverage of a local private non-Third Generation Partnership Project (non-3GPP) wireless network (e.g. a Wi-Fi network) of an enterprise. This non-3GPP wireless network may be part of a private communication system of the enterprise which further includes a local private 3GPP network (e.g. a Long-Term Evolution or "LTE" based network). When the non-3GPP wireless network advertises "single-authentication" support, the UE may complete authentication for non-3GPP access, obtain a Master Session Key (MSK) from the authentication, and generate an Access Security Management Entity (ASME) key ($K_{ASME}$) based on the MSK. In further implementations, the UE may obtain a Globally Unique Temporary Identifier (GUTI) from the non-3GPP wireless network. Subsequently, the UE may perform an attach procedure with the local private 3GPP network without performing an authentication procedure, presenting the GUTI that it obtained from the non-3GPP wireless network for 3GPP access.

21 Claims, 24 Drawing Sheets

(51) Int. Cl.
*H04W 12/00* (2009.01)
*H04L 9/08* (2006.01)
*H04W 84/04* (2009.01)
*H04W 60/04* (2009.01)
*H04W 12/10* (2009.01)

(52) U.S. Cl.
CPC ... *H04W 12/0401* (2019.01); *H04W 12/1006* (2019.01); *H04W 60/04* (2013.01); *H04W 84/042* (2013.01)

(56) References Cited

U.S. PATENT DOCUMENTS

| | | | |
|---|---|---|---|
| 9,420,002 | B1 | 8/2016 | McGovern et al. |
| 9,739,867 | B2 | 8/2017 | Nylander et al. |
| 9,813,978 | B2 | 11/2017 | Cho et al. |
| 2006/0268902 | A1 | 11/2006 | Bonner |
| 2006/0270411 | A1 | 11/2006 | Grayson |
| 2011/0004762 | A1 | 1/2011 | Horn |
| 2014/0073289 | A1 | 3/2014 | Velasco |
| 2016/0337858 | A1 | 11/2016 | Weidenfeller et al. |
| 2017/0164200 | A1 | 6/2017 | Naslund et al. |
| 2017/0223531 | A1 | 8/2017 | Mestanov et al. |
| 2018/0092147 | A1 | 3/2018 | Pelletier et al. |
| 2018/0184297 | A1 | 6/2018 | Mohamed et al. |
| 2018/0227752 | A1 | 8/2018 | Teyeb et al. |
| 2018/0262943 | A1 | 9/2018 | Gupta et al. |
| 2019/0199725 | A1 | 6/2019 | Pularikkal et al. |
| 2019/0215691 | A1* | 7/2019 | Salkintzis ............. H04L 63/166 |
| 2019/0261178 | A1* | 8/2019 | Rajadurai ........... H04W 12/001 |
| 2020/0015079 | A1* | 1/2020 | Li ........................... H04W 8/08 |

OTHER PUBLICATIONS

Ramadan et al., "User-to-user mutual authentication and key agreement scheme for LTE cellular system", International Journal of Network Security, vol. 18, No. 4, Research Gate, Jul. 2016, 14 pages.
3GPP, "Digital cellular telecommunications system (Phase 2+) (GSM); Universal Mobile Telecommunications System (UMTS); LTE; 3GPP System Architecture Evolution (SAE); Security architecture (3GPP TS 33.401 version 15.4.0 Release 15)", ETSI TS 133 401 V15.4.0 (Jul. 2018), 162 pages.
Aboba et al., "Extensible Authentication Protocol (EAP) Key Management Framework", Network Working Group, Aug. 2008, 79 pages.
Hassanein et al., "New Authentication and Key Agreement Protocol for LTE-WLAN Interworking", International Journal of Computer Applications (0975-8887) vol. 61—No. 19, Jan. 2013, 5 pages.
Fidelis et al., "Enhanced Adaptive Security Protocol in LTE AKA", IJCSMC, vol. 3, Issue. 10, Oct. 2014, ISSN 2320-088X, 12 pages.
Cuevas et al., "Usability and Evaluation of a Deployed 4G Network Prototype", Journal of Communications and Networks, vol. 7, No. 2, Jun. 2005, 10 pages.
Norrman et al., "Protecting IMSI and User Privacy in 5G Networks", Proceedings of the 9th EAI International Conference on Mobile Multimedia Communications. ICST (Institute for Computer Sciences, Social-Informatics and Telecommunications Engineering), Jun. 18-20, 2016, 8 pages.
Valmikam et al., "Extensible Authentication Protocol (EAP) Attributes for Wi-Fi Integration with the Evolved Packet Core", Internet Engineering Task Force (IETF), Feb. 2005, 18 pages.
CBRS Alliance , "Extended Subscriber Authentication Technical Specifications", CBRSA-TS-1003 V2.0.0, Jan. 11, 2019, 37 pages.
Juniper Networks, Inc., "3GPP WLAN Interworking", https://www.juniper.net/documentation/software/aaa_802/msaaa11/sw-imsaaa-admin/html/Overview3.html, downloaded Apr. 1, 2020, 4 pages.
Nanjing ZTE software Co. Ltd., "ZTE Authentication Solution Builds a Secure 5G Network", Jun. 17, 2019, 8 pages.
Huawei, "Partnering with the Industry for 5G Security Assurance", downloaded Apr. 1, 2020, 22 pages.
Alcatel, Lucent, "Expanding the Secure Delivery of Ultra5broadband Mobile Services Over Untrusted WI5F1", Application Note, MKT2014066359EN, Aug. 2014, 11 pages.
Norrman, Karl et al., "5G security -trustworthy 5G system", Whitepaper, https://www.ericsson.com/en/reports-and-papers/white-papers/5g-security—enabling-a-trustworthy-5g-system, Jan. 8, 2020, 3 pages.
Aruba, "Integrating Wi-Fi and Cellular Networks", WP_WiFiCoreIntegration_052616, May 26, 2016, www.arubanetworks.com, 10 pages.

* cited by examiner

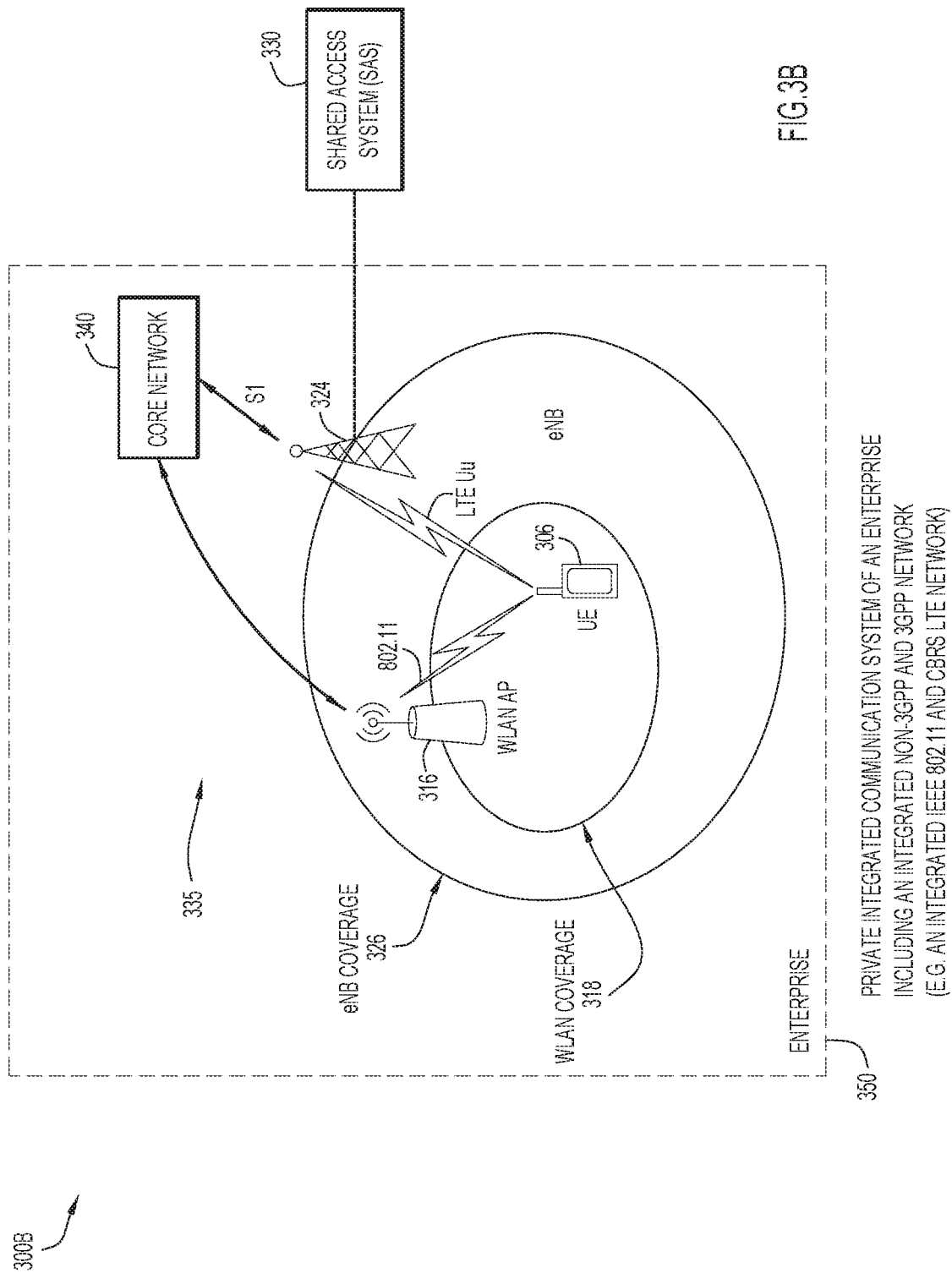

US 10,750,366 B1

EFFICIENT AUTHENTICATION AND SECURE COMMUNICATIONS IN PRIVATE COMMUNICATION SYSTEMS HAVING NON-3GPP AND 3GPP ACCESS

TECHNICAL FIELD

The present disclosure relates generally to communication systems, and more particularly to authentication, key generation, and subscriber identity protection in private communication systems of enterprises.

BACKGROUND

A user equipment (UE) may include a Third Generation Partnership Project (3GPP) radio transceiver for communication in a public 3GPP (cellular) network and a non-Third Generation Partnership Project (non-3GPP) radio transceiver for communication in a local private non-3GPP wireless network. The public 3GPP network may be, for example, a Fourth Generation (4G)/Long Term Evolution (LTE) based network, and the non-3GPP wireless network may be an Institute of Electrical and Electronics Engineers (IEEE) 802.11 compliant wireless local area network (WLAN).

Typically, an enterprise utilizes a local private WLAN (e.g. an enterprise Wi-Fi network) to provide wireless communication for UEs on enterprise premises. Looking ahead, an enterprise may additionally utilize a local private 3GPP network operative in a shared spectrum, such as a Citizens Broadcast Radio Services (CBRS) band. Spectrum sharing in a CBRS network is facilitated by a spectrum access system (SAS) which is configured to authorize and manage the use of spectrum of CBRS base stations across different CBRS networks.

Private LTE network deployments operating in CBRS and other bands may be based on the same backend service core as traditional LTE deployments. Here, subscriber access to packet core services may be made through a 3GPP-defined Evolved Packet Core (EPC). Core network functions of the EPC may include a Mobility Management Entity (MME), a Policy and Charging Rules Function (PCRF), a Packet Data Network Gateway (PGW), and a Serving Gateway (SGW).

Given the addition of a local private 3GPP network to an enterprise, concerns regarding resource, maintenance, and communication efficiency as well as security are raised.

Specifically, an enterprise deploying a private LTE network may be required to host and manage all of the complex 3GPP radio and core network functions. Alternatively, the enterprise may involve a service provider for hosting the 3GPP radio and LTE service layers of the private LTE network. Here, no reuse of existing enterprise wireless services is typically involved a private LTE network deployment. Also, there may be no simple way to realize unified policy control between the existing enterprise Wi-Fi network and the newly-provided private LTE network. Even further, it may make little sense to use a 3GPP-defined service-oriented architecture having a rich set of features in enterprise architectures where many or most of the features have little or no relevance to the enterprise. As is apparent, these options may be relatively expensive options for an enterprise.

BRIEF DESCRIPTION OF THE DRAWINGS

FIG. 3B is an illustrative representation of a private communication system of an enterprise, where the private communication system has an integrated local private non-3GPP and 3GPP network according to some implementations;

DESCRIPTION OF EXAMPLE EMBODIMENTS

Figure 1:
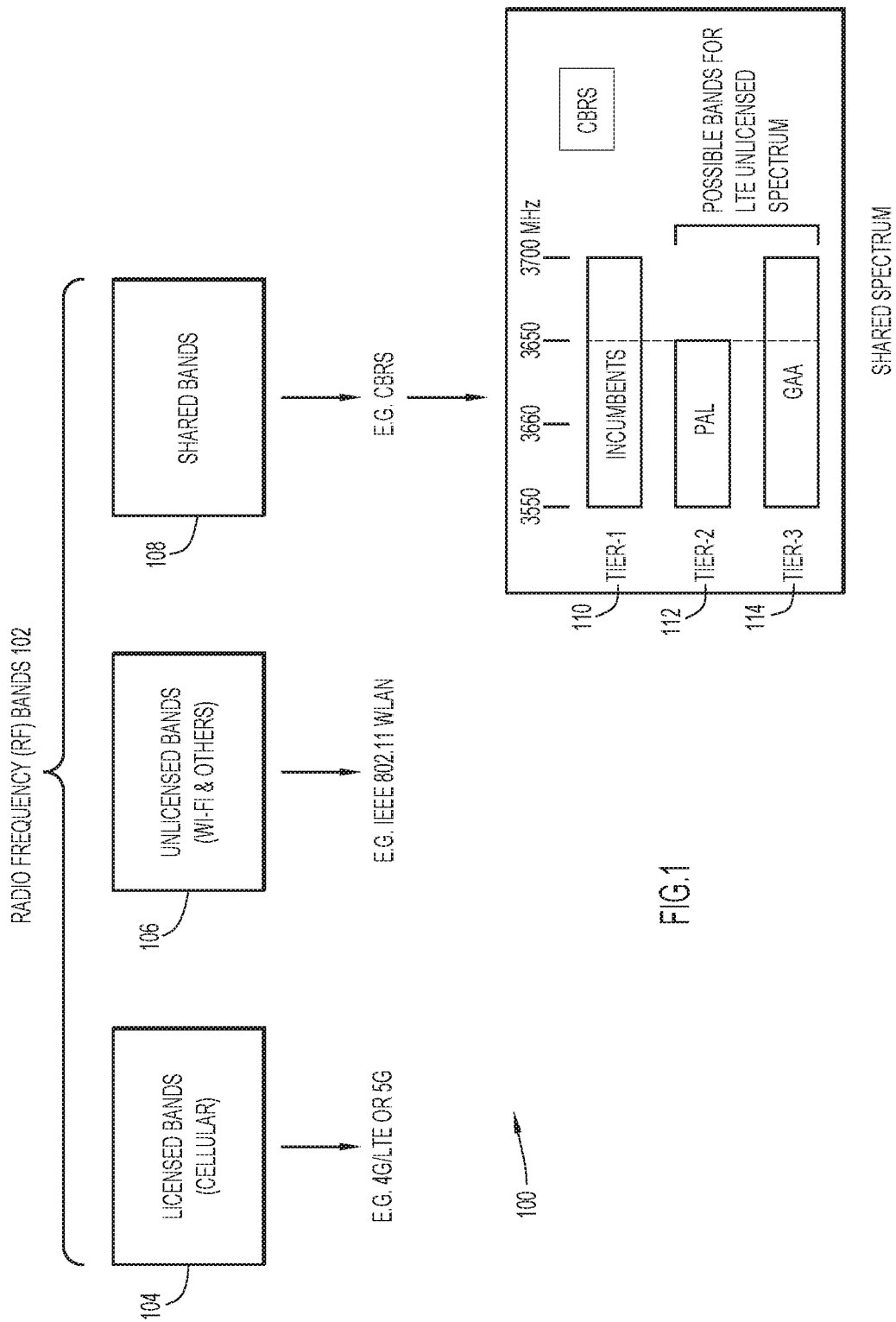
FIG. 1 is a reference diagram for describing radio frequency (RF) bands used for radio communications for mobile devices or user equipments (UEs)

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for use in efficient authentication and secure communications in private communication systems which provide both non-Third Generation Partnership Project (non-3GPP) access and 3GPP access are described herein. The techniques and mechanisms of the present disclosure may be suitable for use in enterprise environments.

In one illustrative example, a user equipment (UE) may be in coverage of a local private non-3GPP wireless network (e.g. a Wi-Fi network) of an enterprise. This non-3GPP wireless network may be part of a private communication system of the enterprise which further includes a local private 3GPP network. When the non-3GPP wireless network advertises "single-authentication" support, the UE may complete authentication for non-3GPP access (e.g. using predefined extensions), obtain a Master Session Key (MSK) from the authentication, and generate an Access Security Management Entity (ASME) key ($K_{ASME}$) based on the MSK. Subsequently, the UE may perform an attach procedure with the local private 3GPP network without performing an authentication procedure therein. The $K_{ASME}$ may be used by both the 3GPP network and the UE for deriving one or more 3GPP-type security keys for securing communications for the UE.

In some implementations, the UE may also obtain a Globally Unique Temporary Identifier (GUTI) from the non-3GPP wireless network during the authentication procedure with the non-3GPP wireless network. Subsequently, when the UE performs the attach procedure with the local private 3GPP network, the UE may present the GUTI that it obtained from the non-3GPP wireless network.

The techniques and mechanisms of the present disclosure may be implemented in relation to a private communication system including a local private 3GPP network based on Fourth Generation (4G), Long-Term Evolution (LTE) technology with Evolved Packet Core (EPC) functionality, and may further operate in a shared spectrum controlled according to a system for shared spectrum access (e.g. Citizens Broadband Radio Service or "CBRS"). On the other hand, the techniques and mechanisms of the present disclosure may be alternatively implemented in relation to a private communication system including a local private 3GPP network which is based on Fifth Generation (5G) technology (e.g. 3GPP access which is based on 5G or New Radio "NR") or other future generation or version of 3GPP hereinafter developed.

In some preferred implementations, the techniques and mechanisms of the present disclosure may be used together in an effort to unify service layers of co-located non-3GPP and 3GPP networks in a private communication system of an enterprise. In some implementations, one objective may be to substantially reduce or eliminate the need for 3GPP core functionality in enterprise deployments.

More detailed and alternative techniques and implementations are provided herein as described below.

EXAMPLE EMBODIMENTS

As described in the Background section, a user equipment (UE) may include a Third Generation Partnership Project (3GPP) radio transceiver for communication in a public 3GPP network and a non-3GPP (non-3GPP) radio transceiver for communication in a local private non-3GPP wireless network. The public 3GPP network may be, for example, a Fourth Generation (4G)/Long Term Evolution (LTE) based network, and the non-3GPP wireless network may be an Institute of Electrical and Electronics Engineers (IEEE) 802.11 compliant wireless local area network (WLAN). Communication in the public 3GPP network may occur in a licensed band, whereas communication in the local private non-3GPP wireless network may occur in an unlicensed band.

Typically, an enterprise utilizes a local private WLAN to provide wireless communication for UEs on enterprise premises. Looking ahead, an enterprise may additionally utilize a local private 3GPP network operative in shared spectrum of a Citizens Broadcast Radio Services (CBRS) band. Spectrum sharing in a CBRS-based network is facilitated by a spectrum access system (SAS) which is configured to authorize and manage the use of spectrum of CBRS base stations in different CBRS networks. Private LTE network deployments operating in CBRS and other bands may be based on the same backend service core as traditional LTE deployments. Here, subscriber access to packet core services may be made through a 3GPP-defined Evolved Packet Core (EPC). Core network functions of the EPC may include a Mobility Management Entity (MME), a Policy and Charging Rules Function (PCRF), a Packet Data Network Gateway (PGW), and a Serving Gateway (SGW).

Given the addition of a local private 3GPP network to an enterprise, concerns regarding resource, maintenance, and communication efficiency as well as security are raised.

Specifically, an enterprise deploying a private LTE network may be required to host and manage all of the complex 3GPP radio and core network functions. Alternatively, the enterprise may involve a service provider for hosting the 3GPP radio and LTE service layers of the private LTE network. Here, no reuse of existing enterprise wireless services is typically involved a private LTE network deployment. Also, there may be no simple way to realize unified policy control between the existing enterprise Wi-Fi network and the newly-provided private LTE network. Even further, it may make little sense to use a 3GPP-defined service-oriented architecture having a rich set of features in enterprise architectures where many or most of the features have little or no relevance to the enterprise. As is apparent, these options may be relatively expensive options for an enterprise.

Techniques and mechanisms for use in efficient authentication and secure communications in private communication systems which provide both non-3GPP access and 3GPP access are described herein. The techniques and mechanisms of the present disclosure may be suitable for use in enterprise environments.

In at least some implementations, techniques and mechanisms of the present disclosure may be used together in an effort to unify service layers of co-located non-3GPP and 3GPP networks (e.g. Wi-Fi and LTE) in a private communication system of an enterprise. In some implementations, one objective may be to substantially reduce or eliminate the need for 3GPP core functionality (e.g. LTE functionality) in enterprise deployments.

The techniques and mechanisms of the present disclosure may be implemented in relation to a private communication system having a local private 3GPP network which is based on 4G/EPC/LTE (or 3GPP access which is based on LTE), Fifth Generation (5G) technology (or 3GPP access which is based on 5G or New Radio "NR"), or any other suitable generation or version of 3GPP hereinafter developed. In addition, the techniques and mechanisms of the present disclosure may be implemented in relation to a private communication system having a local private 3GPP network operative in a CBRS band, or in any other suitable private spectrum or shared spectrum which may be regulated and/or controlled according to a system for shared spectrum access.

FIG. 1 is a reference diagram 100 for describing radio frequency (RF) bands 102 used for radio communications for UEs. RF bands 102 may include licensed bands 104 for 3GPP or cellular networks (e.g. 4G/LTE or 5G networks), unlicensed bands 106 for non-3GPP or Wi-Fi networks (e.g. IEEE 802.11 WLANs), and shared bands 108 (e.g. for CBRS).

CBRS provides for use of a 150 MHz-wide broadcast band in the 3550-3700 MHz frequency range, i.e. Time Division (TD) Long-Term Evolution (LTE) (TD-LTE) band "48." There are three types of users allowed to access this spectrum, including incumbent users, Priority Access License (PAL) users, and General Authorized Access (GAA) users. The SAS serves to protect incumbents from interference from lower-tier PAL and GAA users, and protects PAL users from interference from other PAL and GAA users. The SAS maintains database information of spectrum usage by incumbent, PAL, and GAA users in all census tracts (or areas) and allocates channels to base stations (also referred to as Citizens Broadband Radio Service Devices or "CBSDs") according to a variety of rules.

For example, a Tier-1 type 110 or incumbent users (such as navy ships, military radars and fixed satellite service earth stations) are allocated access to all the channels. A Tier-2 type 112 or PAL users are granted access in the 3550-3650 MHz band and are allowed to use a maximum of seven (7) 10 MHz channels in a census tract (or area). Here, no licensee is allowed to take more than four (4) PAL channels in a census tract. A Tier-3 type 114 or GAA users are allowed access to all the channels, but only channels that are not being used by the other above-indicated users. A SAS makes determinations based on multiple factors and informs CBSDs of allowable operating parameters (e.g. frequency band or channel and maximum Effective Isotropic Radiated Power or "EIRP") that it can use at a given point of time, to ensure compliance with regulations with the Federal Communications Commission (FCC) and other regulatory bodies.

FIGS. 2A-2D are illustrative representations 200A-200D of different scenarios for communications involving a UE 202 operating in a public 3GPP (cellular) network 210 and/or in a private communication system 240 of an enterprise according to some implementations of the present disclosure. Private communication system 240 of the enterprise may include a local private non-3GPP wireless network 220 and a local private 3GPP network 230 operative in a shared spectrum according to a system for shared spectrum access 270. Public 3GPP network 210 may include a core network and one or more base stations 212 such as a base station 214 (e.g. an eNB). Public 3GPP network 210 may be or be referred to as a macro-cellular network. Local private non-3GPP wireless network 220 may include a non-3GPP core network and one or more access points (APs), such as an AP 222, connected to the non-3GPP core network. Local private 3GPP network 230 may include a 3GPP core network and one or more base stations, such as a base station 232, connected to the 3GPP core network.

UE 202 may be provided with a non-3GPP radio transceiver and a 3GPP radio transceiver. The non-3GPP radio transceiver of UE 202 may be operative for communication in local private non-3GPP wireless network 220. The 3GPP radio transceiver of UE 202 may be operative for communication in a 3GPP network, which may be public 3GPP network 210 or local private 3GPP network 230 operative in a shared spectrum according to a system for shared spectrum access. In some implementations, UE 202 may operate the 3GPP radio transceiver according to Dual SIM Dual Standby (DSDS).

In some implementations, private communication system 240 may be an enterprise system of an enterprise, where local private non-3GPP wireless network 220 is an enterprise local private non-3GPP wireless network of the enterprise and local private 3GPP network 230 is an enterprise local private 3GPP network of the enterprise. In some implementations, local private non-3GPP wireless network 220 may be a local private IEEE 802.11 compliant WLAN including one or more IEEE 802.11 compliant APs. Local private 3GPP network 230 may be a local private LTE network or a local private 5G network. The shared spectrum may be CBRS shared spectrum, where the system for shared spectrum access 270 is a SAS, and where a given base station or "CBRS" base station (e.g. base station 232) in the local private 3GPP network may be referred to as a CBSD.

Figure 3A:
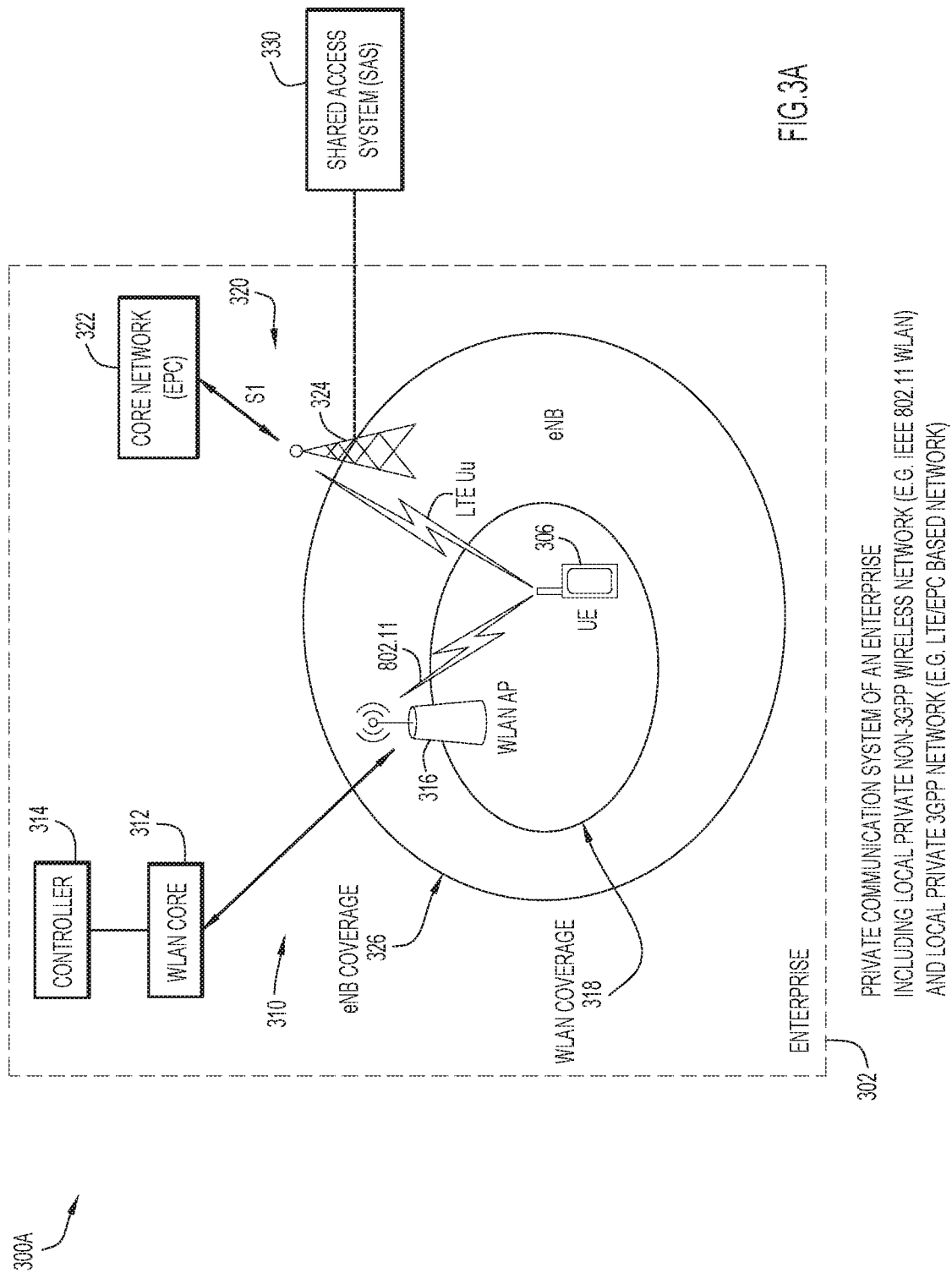
FIG. 3A is an illustrative representation of a private communication system of an enterprise, where the private communication system includes the local private non-3GPP wireless network and the local private 3GPP network are provided in the private communication system as separate networks according to some implementations.

In some implementations, the networks of private communication system 240 are provided as separate networks. Referring ahead to FIG. 3A, an illustrative representation 300A of a private communication system 302 of an enterprise is shown. In FIG. 3A, private communication system 302 is made of separate networks which include a local private WLAN 310 and a local private CBRS LTE network 320 according to some implementations. Local private WLAN 310 and local private CBRS LTE network 320 may be completely separated, isolated networks; alternatively, the networks may be partially connected networks. Here, local private WLAN 310 may include a WLAN core 312 which includes a controller 314 (e.g. a wireless LAN controller or "WLC") and one or more APs such as an AP 316 which provides a coverage area 318 for a UE 306. Local private CBRS LTE network 320 may include a core network 322 (e.g. an Evolved Packet Core or "EPC," in full or in part, including one or more of an MME, PCRF, SGW, and PGW) and one or more base stations, such as a base station 324 (e.g. a CBRS base station or eNB, which may also referred to as a CBSD) which provides a coverage area 326 for UE 306. Local private CBRS LTE network 320 may provide operation in a CBRS shared spectrum according to a SAS 330, or alternatively in a different private spectrum or shared spectrum. As shown in FIG. 3A, coverage area 318 of local private WLAN 310 may overlap with coverage area 326 of local private CBRS LTE network 320, either in part or in substantial part; note, however, that non-overlapping 3GPP and non-3GPP coverage areas may be provided as well (e.g. with continuous coverage).

In a 5G network environment, the local private 3GPP network of FIG. 3A may include a 5G core network and one or more base stations (e.g. a 5G base station or NR, a gNB, a remote radio head "RRH," or the like). The 5G core network may be provided in full or in part, including an Access and Mobility Management Function (AMF), a Session Management Function (SMF), an Authentication Server Function (AUSF), a Policy and Charging Function (PCF), and/or a User Plane Function (UPF).

In other implementations, the networks may be part of a private communication system having an integrated local private non-3GPP and 3GPP network. The integration may involve a shared network infrastructure (in whole or in part), with some or many common or shared nodes, components, functions, or interworking functions. With reference now to FIG. 3B, an illustrative representation 300B of a private communication system 350 of an enterprise is shown, where private communication system 350 has an integrated local private non-3GPP and 3GPP network 335 according to some implementations. Private communication system 350 having integrated local private non-3GPP and 3GPP network 335 may include a (single) core network 340 or infrastructure, the one or more APs (such as AP 316) connected to core network 340, and the one or more base stations (such as base station 324) connected to core network 340.

In FIG. 3B, the 3GPP network portion of integrated local private non-3GPP and 3GPP network 335 may be based on 4G/EPC/LTE, 5G, or future 3GPP generation or version. In some implementations, private communication system 350 having integrated local private non-3GPP and 3GPP network 335 may be based on (a traditional, existing) enterprise WLAN or WLAN infrastructure, where CBRS 3GPP access is provided as an "add-on" feature or service. In some implementations, core network 340 may be or include a cellular termination function, described in relation to FIGS. 10A-10C, which is added to the infrastructure.

Figure 2A:
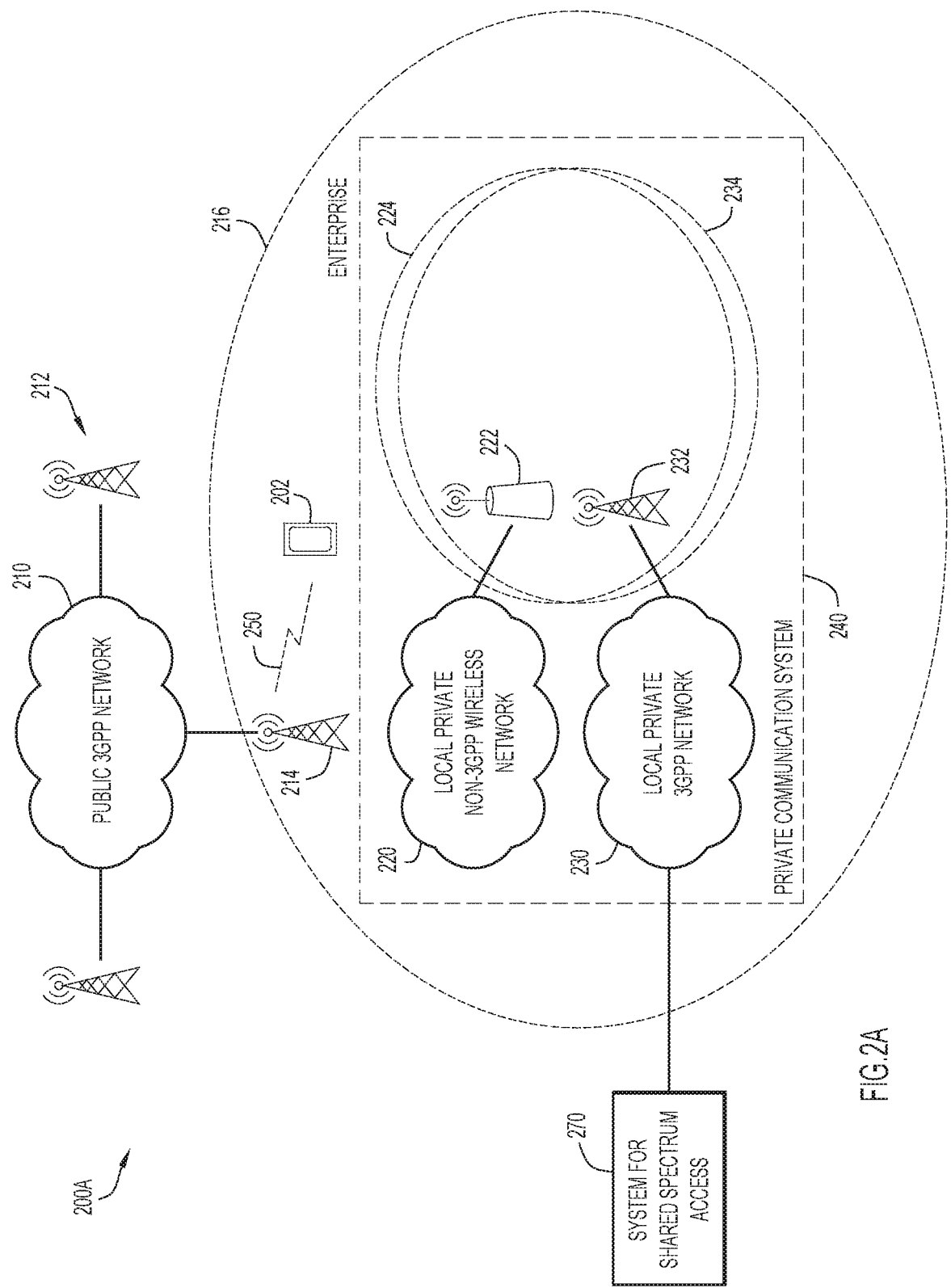
FIGS. 2A-2D are illustrative representations of different scenarios for communication involving a UE in a public Third Generation Partnership Project (3GPP) (cellular) network and in a private communication system of an enterprise according to some implementations of the present disclosure, where the private communication system includes a local private non-3GPP wireless network and a local private 3GPP network (e.g. operative in a shared spectrum according to a system for shared spectrum access)

With general reference back to the different scenarios in FIGS. 2A-2D, and more particularly with the scenario in FIG. 2A, UE 202 is shown to be located within a coverage area 216 of base station 214 of public 3GPP network 210 and operate for a communication 250 in public 3GPP network 210 via base station 214. In FIG. 2A, UE 202 is located outside of a coverage area 224 of local private non-3GPP wireless network 220 for communication, and located outside of a (substantially overlapping) coverage area 234 of local private 3GPP network 230 for communication. Coverage area 224 of local private non-3GPP wireless network 220 may overlap with coverage area 234 of local private 3GPP network 230, either in part or in substantial part; again, however, non-overlapping 3GPP and non-3GPP coverage areas may be provided as well (e.g. with continuous coverage).

Communication in public 3GPP network 210 may include voice communication and data communication. In some implementations, the 3GPP radio transceiver of UE 202 is operated for communication in public 3GPP network 210 (i.e. for voice and data), without performing regular or intermittent scanning for discovery of local private 3GPP network 230 operative in the shared spectrum according to the system for shared spectrum access. In other implementations, the 3GPP radio transceiver of UE 202 is operated for communication in public 3GPP network 210 (i.e. for voice and data) while performing regular or intermittent scanning for discovery of local private 3GPP network 230, but at relatively lengthy time intervals.

During operation of UE 202 in public 3GPP network 210, UE 202 may perform one or more scan operations using its non-3GPP radio transceiver. In some implementations, the scan operation may be a passive scan operation, which may include (regular or periodic) monitoring or receiving from a non-3GPP access point a beacon message which includes beacon message information. In some implementations, the scan operation may be an active scan operation, which may include transmitting to a non-3GPP access point a probe request message and, in response, receiving from the non-3GPP access point a probe response message.

Figure 2B:
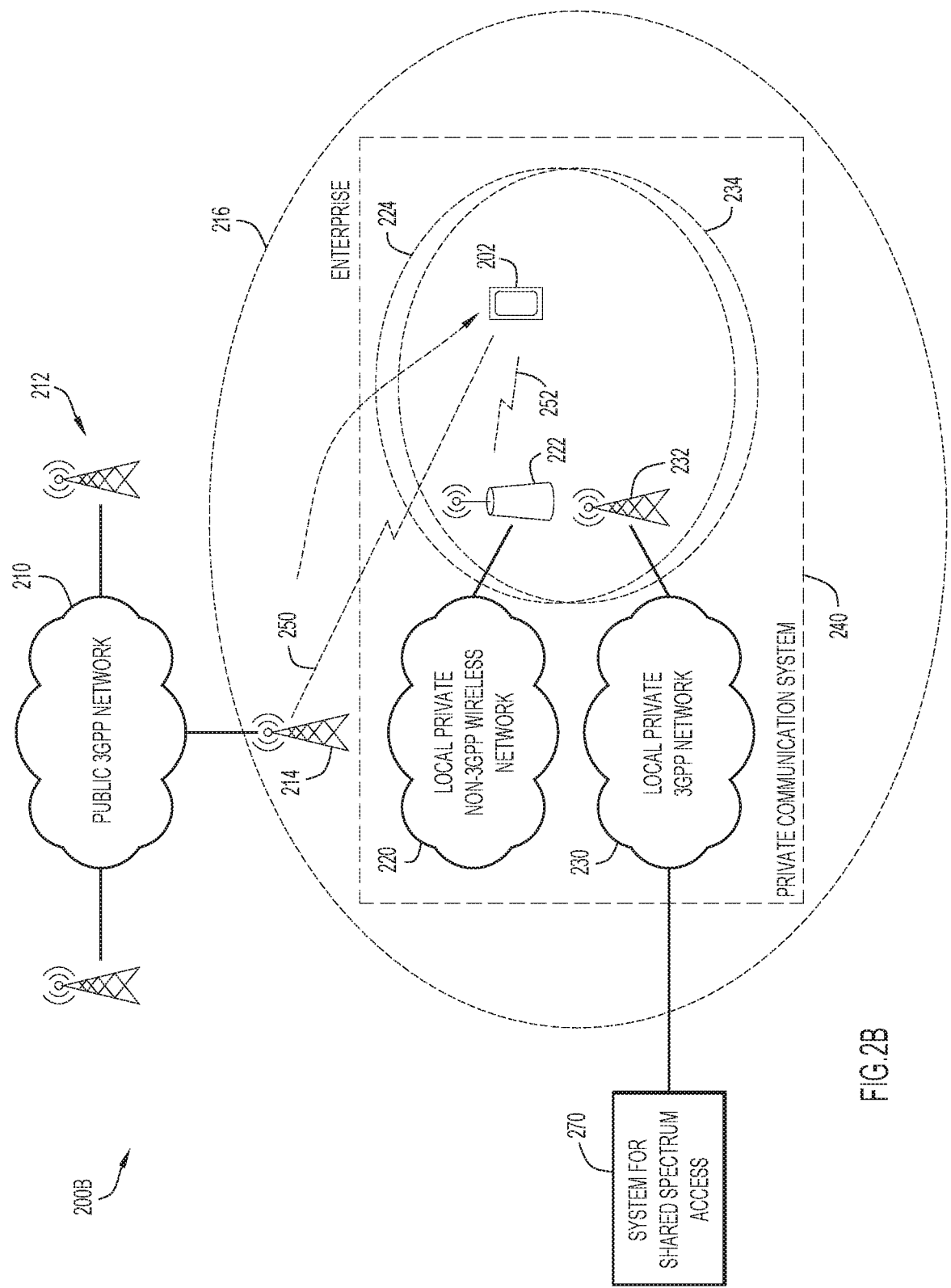

With reference now to FIG. 2B, UE 202 may be relocated such that UE 202 is within coverage area 224 of local private non-3GPP wireless network 220 (as well as coverage area 234 of local private 3GPP network 230). In the scan operation, UE 202 may receive, via the non-3GPP radio transceiver, from a non-3GPP access point (e.g. AP 222), one or more messages including one or more information elements. One or more of these information elements may include one or more identifiers which identify one or more non-3GPP wireless networks with which to connect for communication.

In some implementations, the one or more identifiers may be one or more Set Service Identifiers (SSIDs) which identify one or more IEEE 802.11 compliant WLANs. Here, UE 202 may compare each received SSID with prestored SSIDs stored in a SSID list of UE 202. Upon identifying a matching SSID, UE 202 may identify a non-3GPP wireless network with which to associated with and connect for communication. Here, UE 202 may participate in procedures for association and authentication with a non-3GPP wireless network which is a local private non-3GPP wireless network (e.g. local private non-3GPP wireless network 220 of FIG. 2B). In FIG. 2B, UE 202 has a communication 252 with AP 222 of local private non-3GPP wireless network 220.

In some implementations, one or more of the information elements may further indicate presence of local private 3GPP network 230. In some implementations, one or more information elements which may indicate presence of local private 3GPP network 230 may include one or more of an indicator indicating the presence of local private 3GPP network 230, a Public Land Mobile (PLMN) ID which identifies local private 3GPP network 230, a frequency channel for use in local private 3GPP network 230, and a cell identifier associated with local private 3GPP network 230. UE 202 may store this information in its memory and, in particular, store this information in association with the SSID list.

In some implementations, in CBRS/LTE, the frequency channel may be an E-UTRA ("Evolved Universal Terrestrial Radio Access") Absolute Radio Frequency Channel Number or "EARFCN," where E-UTRA refers to Evolved Universal Mobile Telecommunications System or "UNITS" Terrestrial Radio Access. In LTE, the carrier frequency in the uplink and downlink is designated by the EARFCN, which ranges between 0-65535. In CBRS/LTE, the cell identifier may be a Physical Cell ID (PCI) which is an identifier of a network cell in the physical layer.

Figure 2C:
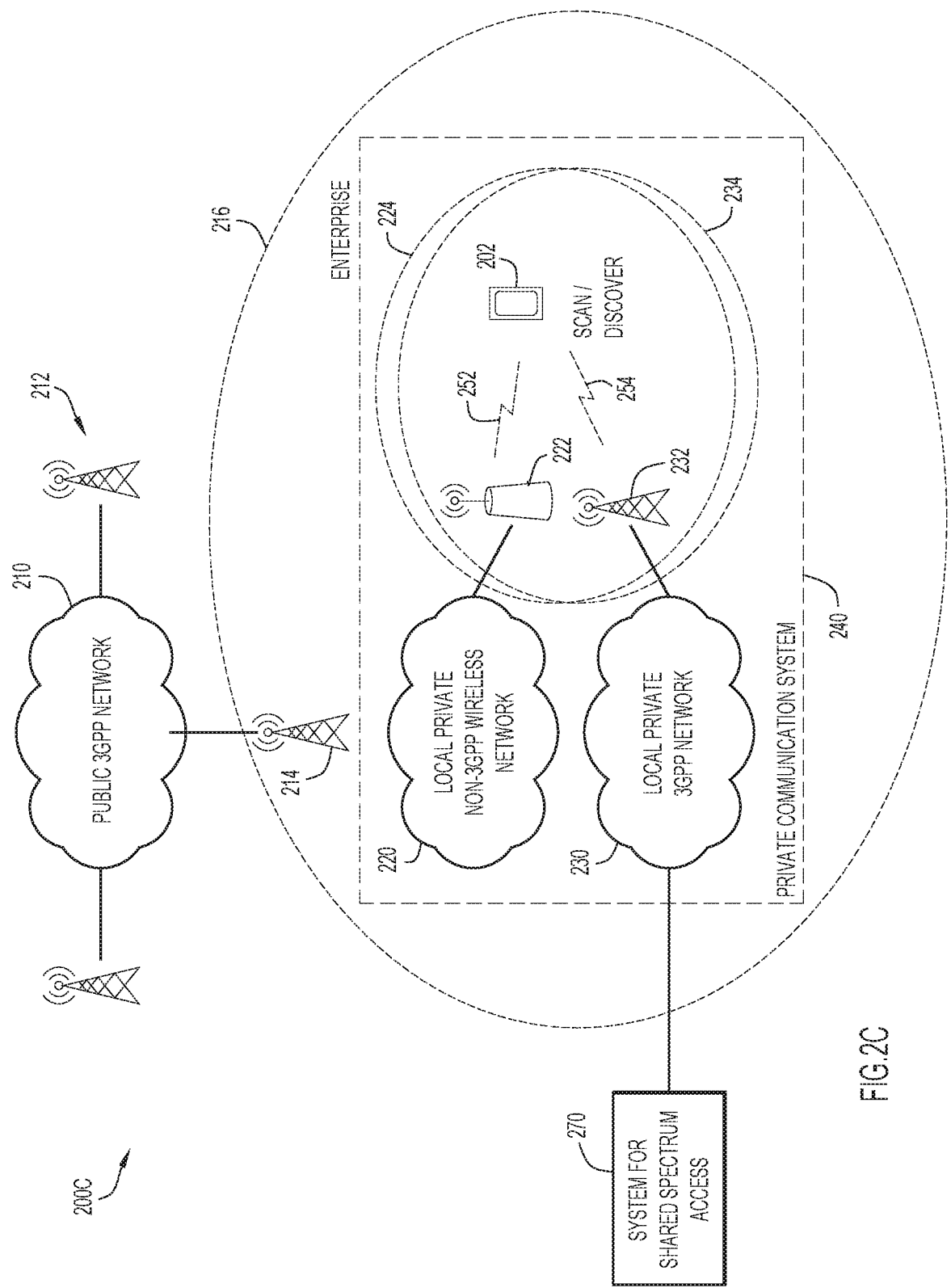

Based on identifying that one or more of the information elements indicate presence of local private 3GPP network 230, UE 202 may operate the 3GPP radio transceiver to scan, discover, or otherwise identify local private 3GPP network 230. With reference now to FIG. 2C, UE 202 is shown to operate to scan, discover, or otherwise identify and register with local private 3GPP network 230 via base station 232 in a communication 254. Thus, in some implementations, the identification of the one or more information elements indicating the presence of local private 3GPP network 230 triggers UE scanning or identification of local private 3GPP network 230 (e.g. for registration). The scanning, discovery, and/or identification may be performed based on or according to the one or more information elements (e.g. the PLMN ID, the frequency channel, and/or the cell identifier).

Eventually, UE 202 may transmit from the 3GPP radio transceiver a message indicating an attach request (a message for registration) to base station 232 of local private 3GPP network 230 for registration in local private 3GPP network 230. Depending on one or more factors, standard authentication with local private 3GPP network 230 may be performed for UE 202 or, alternatively, it may be bypassed or abbreviated (i.e. reduced in complexity and/or in the number of steps; skipping authentication steps and/or key generation steps) according to some implementations. Additionally or alternatively, alternative procedures for secure communications in local private 3GPP network 230 may be performed according to some implementations. Such techniques and mechanisms for efficient authentication and secure communications are described later below in relation to FIGS. 6A-6B, 7A-7B, 8A-8B, 9A-9B, and/or 10A-10C, and/or elsewhere herein.

Figure 2D:
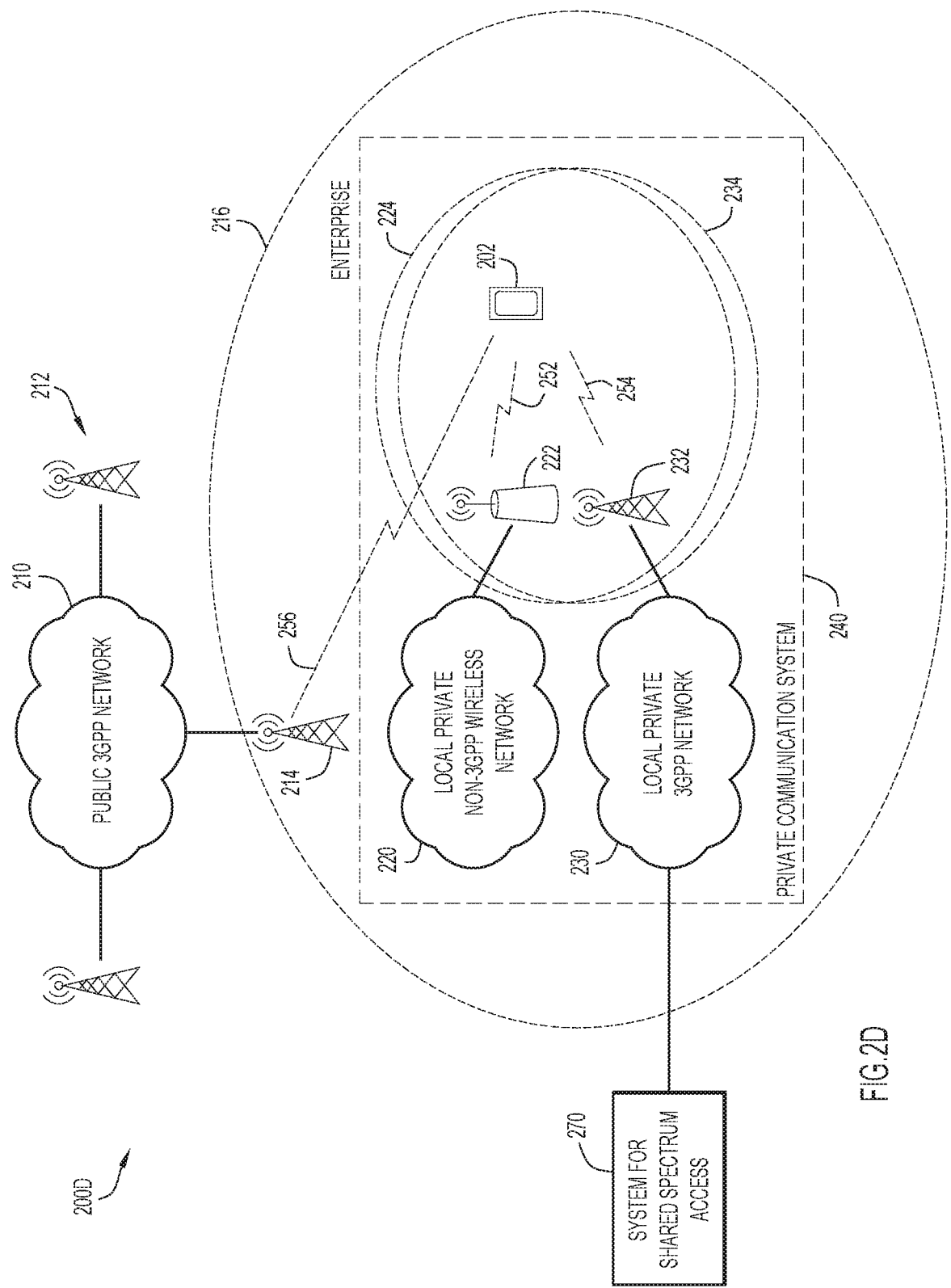

UE 202 may then operate the 3GPP radio transceiver for communication in local private 3GPP network 230. In some implementations, the 3GPP radio transceiver of UE 202 may be controlled to operate in local private 3GPP network 230 for voice and data communication. In some other implementations, the 3GPP radio transceiver of UE 202 may be controlled to operate in public 3GPP network 210 for voice communication and in local private 3GPP network 230 for data communication. It is noted UE 202 may operate with multi-SIM operation and be concurrently attached to multiple networks (e.g. connecting for both voice and data service in each network). With reference now to FIG. 2D, UE 202 is shown to control operation of its 3GPP radio transceiver for a voice communication 256 in public 3GPP network 210 and for (data) communication 254 in local private 3GPP network 230.

With respect to the scanning of UE 202 in FIG. 2B, note that each SSID in the SSID list of SSIDs in UE 202 may be associated with a wireless network profile of a non-3GPP wireless network. At least one of these wireless network profiles may correspond to the local private non-3GPP wireless network which is part of a private communication system including a local private 3GPP network. In some implementations, a wireless network profile corresponding to the local private non-3GPP wireless network may include one or more information items associated with the local private 3GPP network. The one or more information items may include one or more of an indicator indicating the presence of the local private 3GPP network, a PLMN ID which identifies the local private 3GPP network, a frequency channel for use in the local private 3GPP network, and a cell identifier associated with the local private 3GPP network. Thus, the UE 202 may store and/or maintain one or more information items corresponding to the local private 3GPP network in a wireless network profile associated with the SSID of the local private non-3GPP wireless network. In some implementations, a network identifier such as a CBRS Network ID (NID) may be utilized for uniquely identifying the local private 3GPP network. In CBRS, the PLMN ID is shared across multiple enterprises, but a unique CBRS NID is assigned to each enterprise. The CBRS NID is or is based (in substantial part) on a Closed Subscribers Group (CSG) ID which may be broadcasted or otherwise sent from a cell of the network.

Accordingly, UE 202 may identify whether stored information items associated with a local private 3GPP network exist in the wireless network profile associated with the SSID of the local private non-3GPP wireless network. If UE 202 identifies stored information items associated with a local private 3GPP network in the wireless network profile, then UE 202 may operate the 3GPP radio transceiver to scan, discover, or otherwise identify the local private 3GPP network. Thus, in some implementations, the identification of the one or more information items indicating the presence of the local private 3GPP network triggers UE 202 scanning or identification of the local private 3GPP network for registration. The scanning, discovery, and/or identification may be performed based on or according to the one or more information items (e.g. the PLMN ID, the frequency channel, and/or the cell identifier) in the wireless network profile. UE 202 may subsequently transmit from the 3GPP radio transceiver a message indicating an attach request (a registration message) to a 3GPP base station of the local private 3GPP network for registration in the local private 3GPP network. UE 202 may then operate the 3GPP radio transceiver for communication in the local private 3GPP network (e.g. voice and data; or data).

Figure 4A:
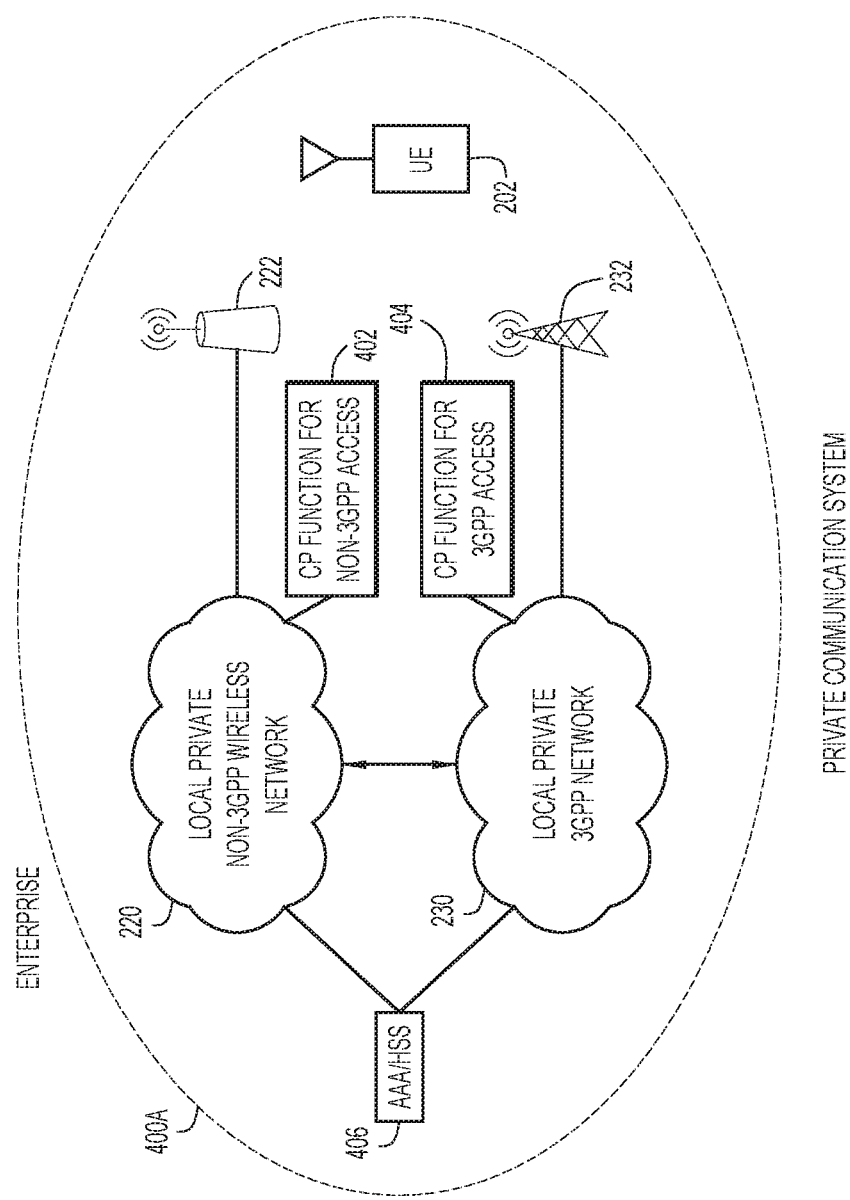
FIG. 4A is an illustrative representation of a private communication system of an enterprise, where the private communication system includes the local private non-3GPP wireless network and the local private 3GPP network provided as separate networks, and where the local private non-3GPP wireless network has a control plane function for non-3GPP access and the local private 3GPP network has a control plane function for 3GPP access, according to some implementations of the present disclosure.

FIG. 4A is an illustrative representation of a private communication system 400A of an enterprise. Private communication system 400A includes local private non-3GPP wireless network 220 and local private 3GPP network 230 provided as separate networks. This arrangement may be the same or similar to that provided for in relation to FIG. 3A. Authentication may be performed with use of an authentication server such as an authentication, authorization, and accounting (AAA) server 406. In some implementations, AAA server 406 may be collocated with a Home Subscriber Server (HSS) or inherit functionality of the HSS (e.g.

resulting in functionality for authentication relating to both non-3GPP and 3GPP access). Further shown in private communication system 400A of FIG. 4A is that local private non-3GPP wireless network 220 has a control plane function for non-3GPP access 402 operative according to the present disclosure, and that local private 3GPP network 230 has a control plane function for 3GPP access 404 operative according to the present disclosure. In some implementations, an interface may be used by the control plane function for 3GPP access 404 for communication with the control plane function for non-3GPP access 402; similarly, the interface may be used by the control plane function for non-3GPP access 402 for communication with the control plane function for 3GPP access 404. In some implementations, a memory or data store may be used for communication (e.g. of data) via the interface.

Figure 4B:
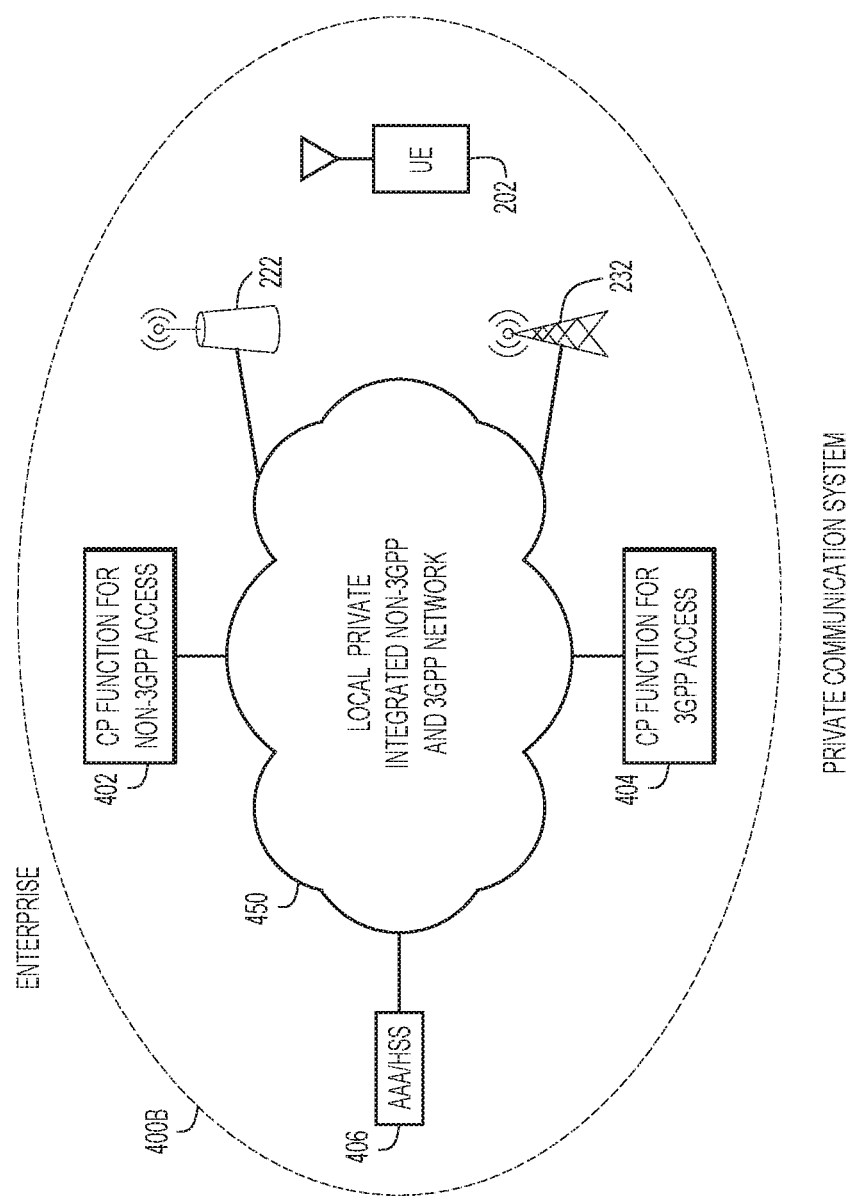
FIG. 4B is an illustrative representation of a private communication system of an enterprise, where the private communication system has an integrated local private non-3GPP and 3GPP network having a control plane function for non-3GPP access and a control plane function for 3GPP access, according to some implementations of the present disclosure.

FIG. 4B is an illustrative representation of a private communication system 400B of an enterprise. Private communication system 400B has a local private integrated non-3GPP and 3GPP network 450. This arrangement may be the same or similar to that provided for in relation to FIG. 3B. Again, authentication may be performed with use of an authentication server such as AAA server 406 or AAA/HSS server. Further shown in private communication system 400B of FIG. 4B is that integrated local private non-3GPP and 3GPP network 450 has the control plane function for non-3GPP access 402 operative according to the present disclosure and the control plane function for 3GPP access 404 operative according to the present disclosure. As described in relation to FIG. 4A, an interface may be used by the control plane function for 3GPP access 404 for communication with the control plane function for non-3GPP access 402; similarly, the interface may be used by the control plane function for non-3GPP access 402 for communication with the control plane function for 3GPP access 404. Again, in some implementations, a memory or data store may be used for communication (e.g. of data) via the interface.

Figure 5:
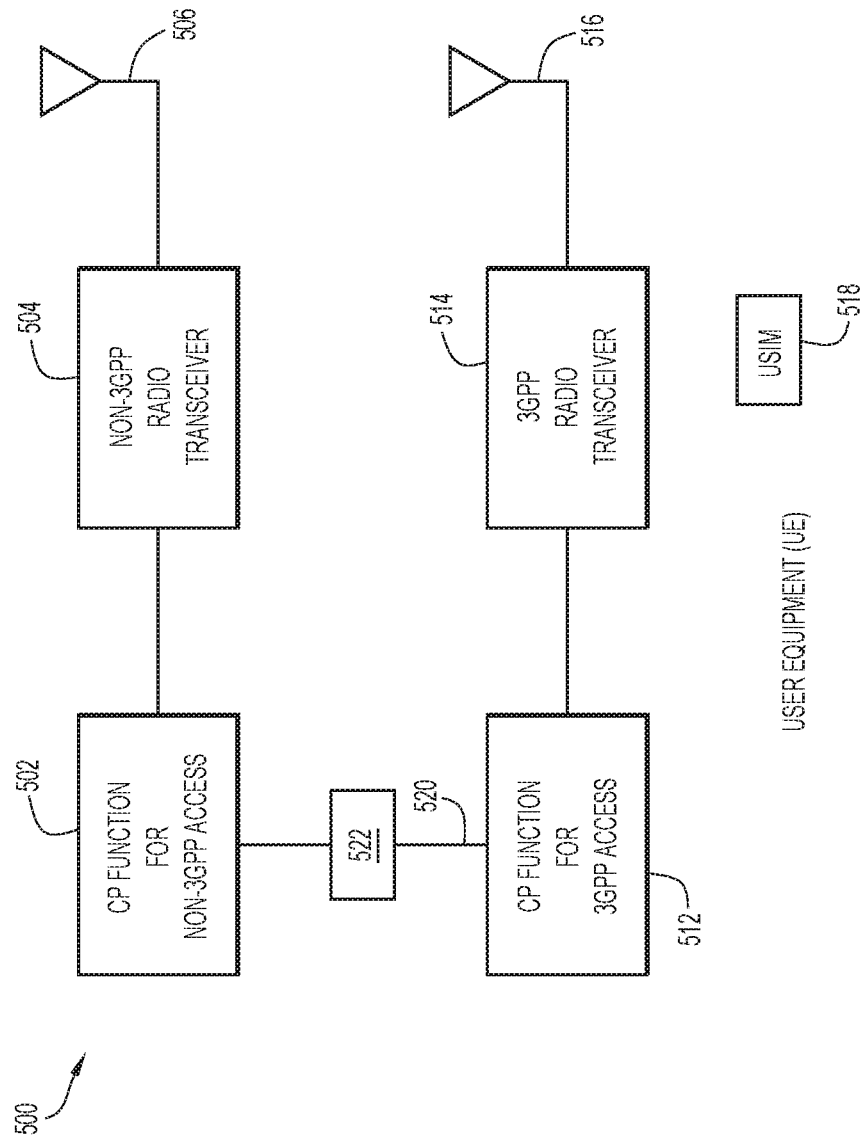
FIG. 5 is a schematic block diagram of a UE having a control plane function for non-3GPP access associated with a non-3GPP radio transceiver and a control plane function for 3GPP access associated with a 3GPP radio transceiver, according to some implementations of the present disclosure.

FIG. 5 is a schematic block diagram of pertinent, select components 500 of a UE having a control plane function for non-3GPP access 502 associated with a non-3GPP radio transceiver 504 (and one or more antennas 506) and a control plane function for 3GPP access 512 associated with a 3GPP radio transceiver 514 (and one or more antennas 516) according to some implementations of the present disclosure. In some implementations, the control plane function for non-3GPP access 502 and/or the control plane function for 3GPP access 512 may be implemented on one or more processors of the UE. An interface 520 may be used by the control plane function for 3GPP access 512 for communication with the control plane function for non-3GPP access 502; similarly, an interface may be used by the control plane function for non-3GPP access 502 for communication with the control plane function for 3GPP access 512. In some implementations, a memory or data store 522 may be used for communication (e.g. of data) via interface 520. The select components 500 of the UE are also shown to include a Subscriber Identity Module (SIM) or Universal SIM (USIM) 518 associated with 3GPP radio transceiver 514. In some implementations, the UE may operate 3GPP radio transceiver 514 according to DSDS.

Various methods are now described in relation to the flowcharts of FIGS. 6A-6B, 7A-7B, 8A-8B, and 9A-9B; these methods may be performed in and by a private communication system and a UE as described herein. The methods to be described in relation to FIGS. 6A-6B, 7A-7B, 8A-8B, and in 9A-9B may be considered to be smaller extracted portions of an end-to-end example call flow/method to be described later in relation to FIGS. 10A-10C. In further implementations, the methods to be described in FIGS. 6A-6B, 7A-7B, 8A-8B, and in 9A-9B may be provided within the context and/or include one or more features or details of the end-to-end example call flow/method of FIGS. 10A-10C described below.

In the described methods, a Master Session Key (MSK) is generated during an authentication procedure for non-3GPP access, and the MSK is used to derive one or more non-3GPP-type security keys. The one or more non-3GPP-type security keys may include, for example, one or more of a Pairwise Master Key (PMK), a Pairwise Transfer Key (PTK), a Group Master Key (GMK), and a Group Temporal Key (GTK). Further, an Access Security Management Entity (ASME) key ($K_{ASME}$) is generated based on the MSK for 3GPP access, and the $K_{ASME}$ is used to derive one or more 3GPP-type security keys. The one or more 3GPP-type security keys may include, for example, one or more of access stratum (AS) security keys (e.g. $K_{nas-int}$ and $K_{nas-enc}$) and/or non-access stratum (NAS) security keys (e.g. $K_{eNB}$, as well as $K_{rrc-int}$, $K_{rrc-enc}$, and $K_{up-enc}$).

Figure 6A:
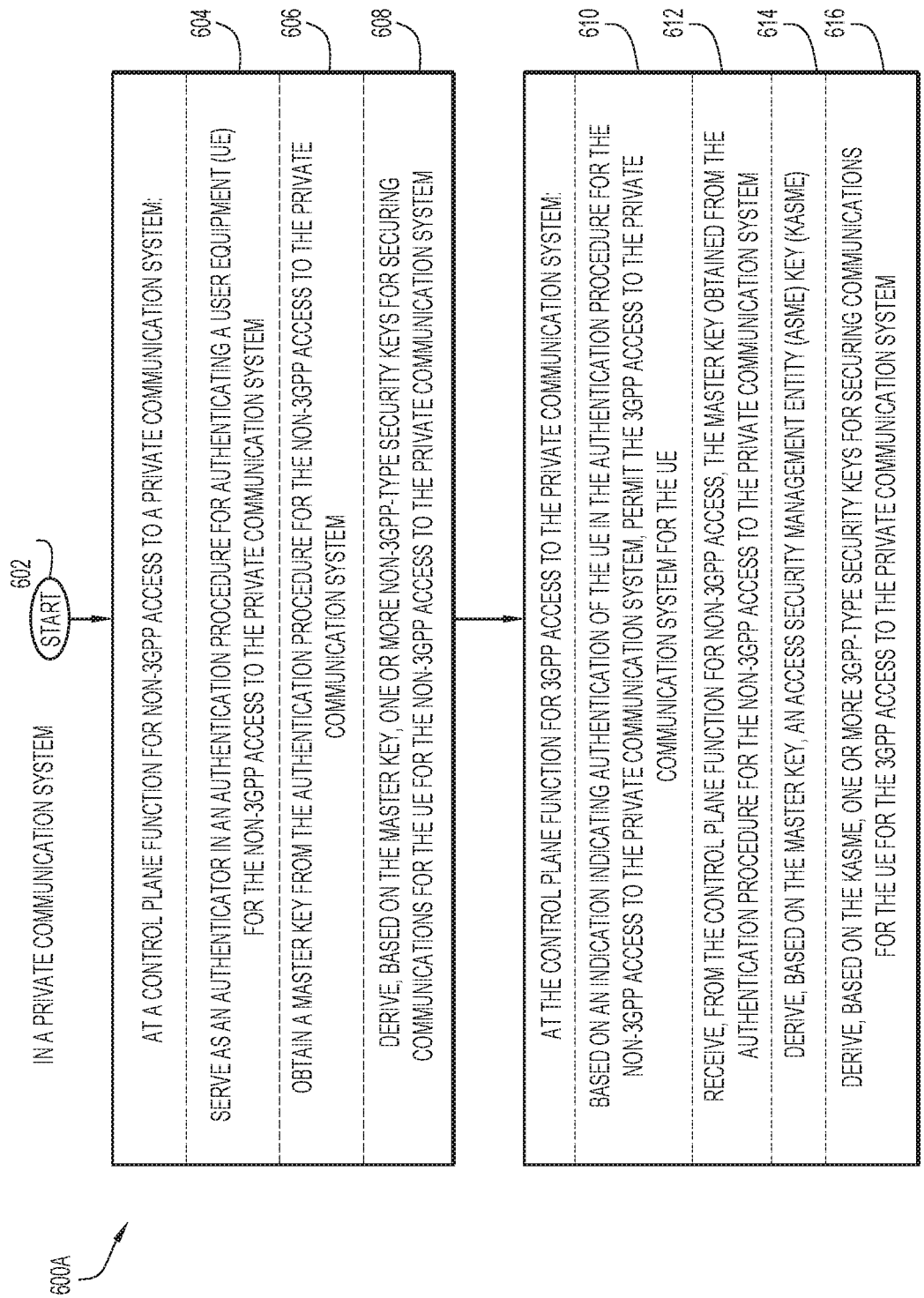
FIG. 6A is a flowchart for describing a method of providing authentication and secure communications in a private communication system having non-3GPP access and 3GPP access according to some implementations of the present disclosure.

FIG. 6A is a flowchart 600A for describing a method of providing authentication and secure communications for a UE in a private communication system having non-3GPP access and 3GPP access according to some implementations of the present disclosure. The method may be performed in the private communication system, and in particular, by a control plane function for non-3GPP access and a control plane function for 3GPP access. The method may be embodied as a computer program product which includes one or more computer readable mediums having instructions stored therein which are executed by one or more network nodes, such as a controller, a network function, an access point, a base station, etc.

Beginning at a start block 602 of FIG. 6A, the control plane function for non-3GPP access may serve as an authenticator in an authentication procedure for authenticating a UE for the non-3GPP access to the private communication system (step 604 of FIG. 6A). The control plane function for non-3GPP access may obtain a master key from the authentication procedure for the non-3GPP access to the private communication system (step 606 of FIG. 6A). The control plane function for non-3GPP access may derive, based on the master key, one or more non-3GPP-type security keys for securing communications for the UE for the non-3GPP access to the private communication system (step 608 of FIG. 6A). Accordingly, the UE may be associated with and successfully authenticated for non-3GPP access to the private communication system with secure communications.

The control plane function for 3GPP access may receive, from the control plane function for non-3GPP access, an indication indicating (e.g. successful) authentication of the UE in the authentication procedure for the non-3GPP access to the private communication system. Accordingly, the control plane function for 3GPP access may permit the 3GPP access to the private communication system for the UE based on the indication indicating (e.g. successful) authentication of the UE in the authentication procedure for the non-3GPP access to the private communication system (step 610 of FIG. 6A). In some implementations, if authentication for non-3GPP access is successful, authentication and security procedures for the UE for 3GPP access may be entirely bypassed or abbreviated (e.g. skipping authentication steps and/or key generation steps, but involving simple checking of data items and/or calculations, etc.). The bypassing or abbreviation of authentication and security procedures for the UE for 3GPP access may occur in response to the UE's sending of a message indicating an attach request for registration (a registration message).

The control plane function for 3GPP access may receive, from the control plane function for non-3GPP access, the master key obtained from the authentication procedure for the non-3GPP access to the private communication system (step 612 of FIG. 6A). The control plane function for 3GPP access may derive, based on the master key, a $K_{ASME}$ (step 614 of FIG. 6A). The control plane function for 3GPP access may derive, based on the $K_{ASME}$, one or more 3GPP-type security keys for securing communications for the UE for the 3GPP access to the private communication system (step 616 of FIG. 6A). Accordingly, the UE may be registered for 3GPP access to the private communications with secure communications.

Figure 6B:
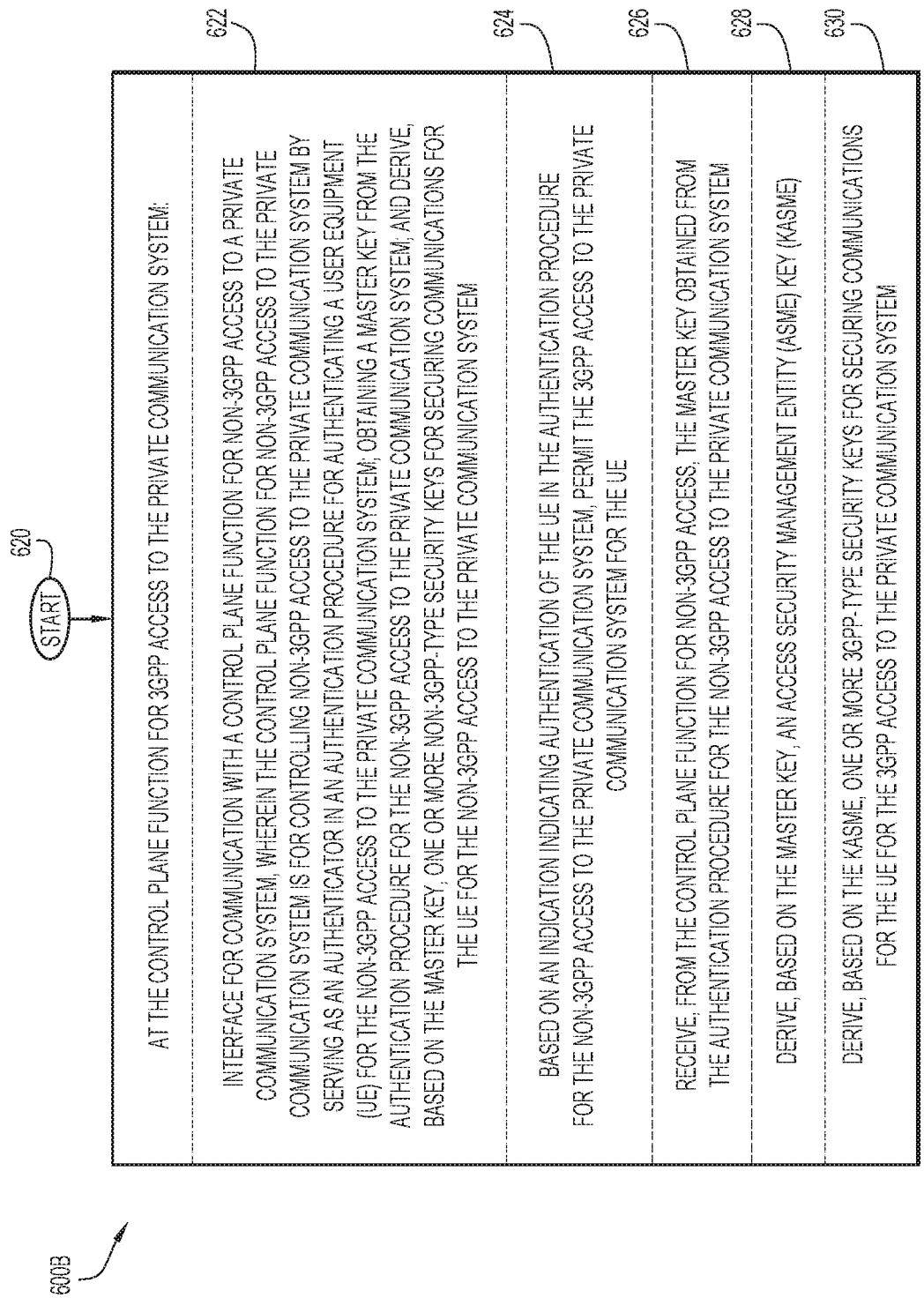
FIG. 6B is a flowchart for describing a method of providing authentication and secure communications in a private communication system having non-3GPP access and 3GPP access, which may be performed by a control plane function for 3GPP access in the private communication system, according to some implementations of the present disclosure.

FIG. 6B is a flowchart 600B for describing a method of providing authentication and secure communications for a UE in a private communication system having non-3GPP access and 3GPP access according to some implementations of the present disclosure. The method may be performed in the private communication system, and in particular, by a control plane function for 3GPP access in the private communication system. The method may be embodied as a computer program product which includes one or more computer readable mediums having instructions stored therein which are executed by one or more network nodes, such as a controller, a network function, an access point, a base station, etc.

Beginning at a start block 620 of FIG. 6B, in general, the control plane function for 3GPP access may interface for communication with a control plane function for non-3GPP access to a private communication system (step 622 of FIG. 6B). The control plane function for non-3GPP access to the private communication system is for controlling non-3GPP access to the private communication system by serving as an authenticator in an authentication procedure for authenticating a UE for the non-3GPP access to the private communication system; obtaining a master key from the authentication procedure for the non-3GPP access to the private communication system; and derive, based on the master key, one or more non-3GPP-type security keys for securing communications for the UE for the non-3GPP access to the private communication system. With such processing, the UE may be associated with and successfully authenticated for non-3GPP access to the private communication system with secure communications.

The control plane function for 3GPP access may receive, from the control plane function for non-3GPP access, an indication indicating (e.g. successful) authentication of the UE in the authentication procedure for the non-3GPP access to the private communication system. Accordingly, the control plane function for 3GPP access may permit the 3GPP access to the private communication system for the UE based on the indication indicating (e.g. successful) authentication of the UE in the authentication procedure for the non-3GPP access to the private communication system (step 624 of FIG. 6B). In some implementations, if authentication for non-3GPP access is successful, authentication and security procedures for the UE for 3GPP access may be entirely bypassed or abbreviated (e.g. skipping authentication steps and/or key generation steps, but perhaps involving simple checking of data items and/or calculations, etc.). The bypassing or abbreviation of authentication and security procedures for the UE for 3GPP access may occur in response to the UE's sending of a message indicating an attach request for registration (a registration message).

The control plane function for 3GPP access may receive, from the control plane function for non-3GPP access, the master key obtained from the authentication procedure for the non-3GPP access to the private communication system (step 626 of FIG. 6B). The control plane function for 3GPP access may derive, based on the master key, a $K_{ASME}$ (step 628 of FIG. 6B). The control plane function for 3GPP access may derive, based on the $K_{ASME}$, one or more 3GPP-type security keys for securing communications for the UE for the 3GPP access to the private communication system (step 630 of FIG. 6B). Accordingly, the UE may be registered for 3GPP access to the private communications with secure communications.

Figure 7A:
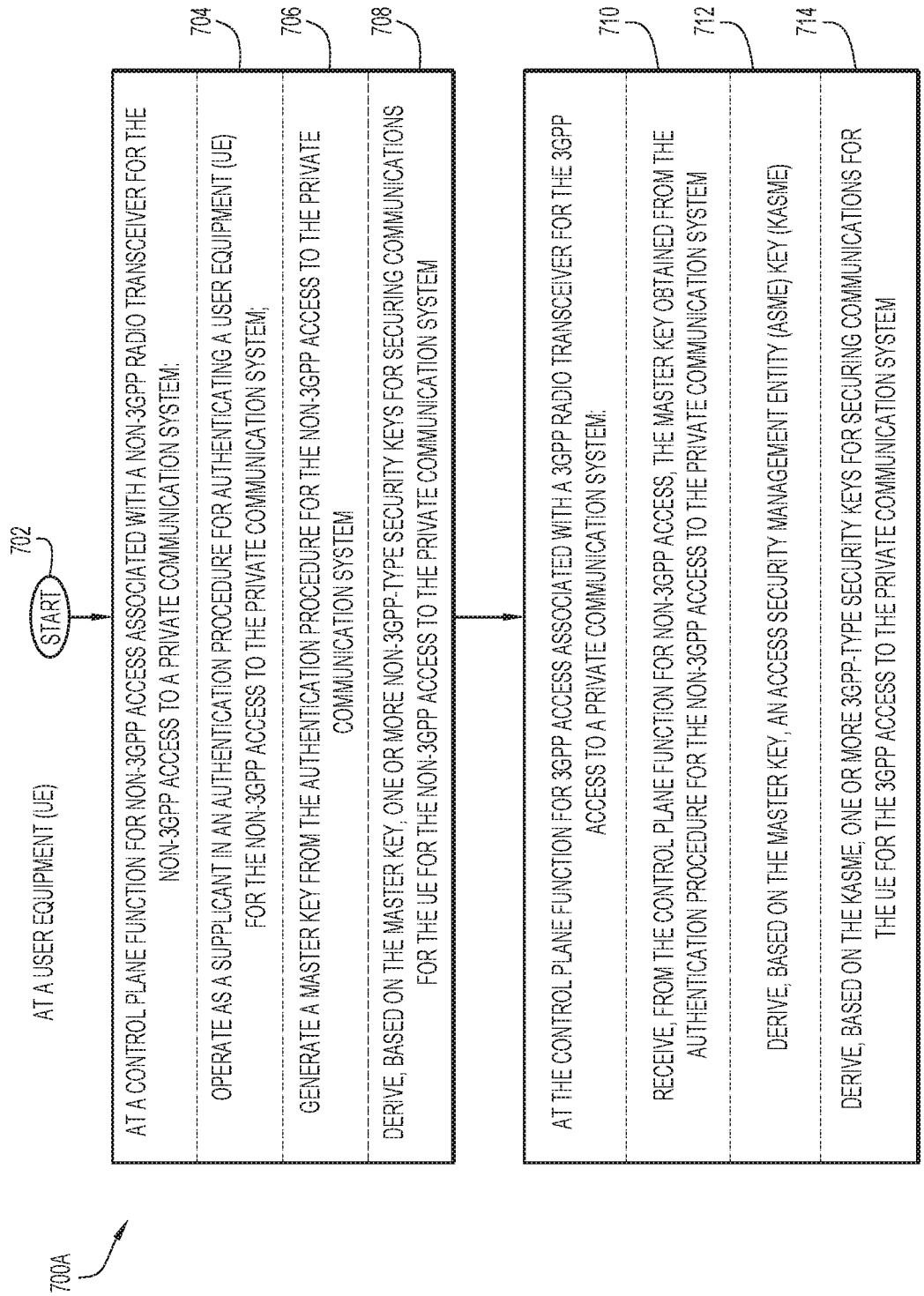
FIG. 7A is a flowchart for describing a method of providing authentication and secure communications in a private communication system having non-3GPP access and 3GPP access, which may be performed by a UE, according to some implementations of the present disclosure.

FIG. 7A is a flowchart 700A for describing a method of providing authentication and secure communications for a UE in a private communication system having non-3GPP access and 3GPP access according to some implementations of the present disclosure. The method may be performed by a UE and, in particular, by a control plane function for non-3GPP access associated with a non-3GPP radio transceiver of the UE and at the control plane function for 3GPP access associated with a 3GPP radio transceiver of the UE. See e.g. FIG. 5. In some implementations, the method of FIG. 7A may be considered to be the complement of the method of FIG. 6A involving the private communication system. The method may be embodied as a computer program product which includes a computer readable medium having instructions stored therein which are executed by one or more processors of the UE.

Beginning at a start block 702 of FIG. 7A, the control plane function for non-3GPP access of the UE may operate as a supplicant in an authentication procedure for authenticating a UE for the non-3GPP access to the private communication system (step 704 of FIG. 7A). The control plane function for non-3GPP access may generate a master key from the authentication procedure for the non-3GPP access to the private communication system (step 706 of FIG. 7A). The control plane function for non-3GPP access may derive, based on the master key, one or more non-3GPP-type security keys for securing communications for the UE for the non-3GPP access to the private communication system (step 708 of FIG. 7A). Accordingly, the UE may be associated with and successfully authenticated for non-3GPP access to the private communication system with secure communications.

The control plane function for 3GPP access of the UE may receive, from the control plane function for non-3GPP access, an indication indicating (e.g. successful) authentication of the UE in the authentication procedure for the non-3GPP access to the private communication system. 3GPP access to the private communication system may be permitted for the UE based on the (e.g. successful) authentication of the UE in the authentication procedure for the non-3GPP access to the private communication system. In some implementations, if authentication for non-3GPP access is successful, authentication and security procedures for the UE for 3GPP access may be entirely bypassed or abbreviated (e.g. skipping authentication steps and/or key generation steps, but perhaps involving simple checking of data items and/or calculations, etc.). The bypassing or abbreviation of authentication and security procedures for the UE for 3GPP access may occur in response to the UE's sending of a message indicating an attach request for registration (a registration message).

The control plane function for 3GPP access of the UE may receive, from the control plane function for non-3GPP access, the master key obtained from the authentication procedure for the non-3GPP access to the private communication system (step 710 of FIG. 7A). The control plane function for 3GPP access may derive, based on the master key, a $K_{ASME}$ (step 712 of FIG. 7A). The control plane function for 3GPP access may derive, based on the $K_{ASME}$, one or more 3GPP-type security keys for securing communications for the UE for the 3GPP access to the private communication system (step 714 of FIG. 7A). Accordingly, the UE may be registered for 3GPP access to the private communications with secure communications.

Figure 7B:
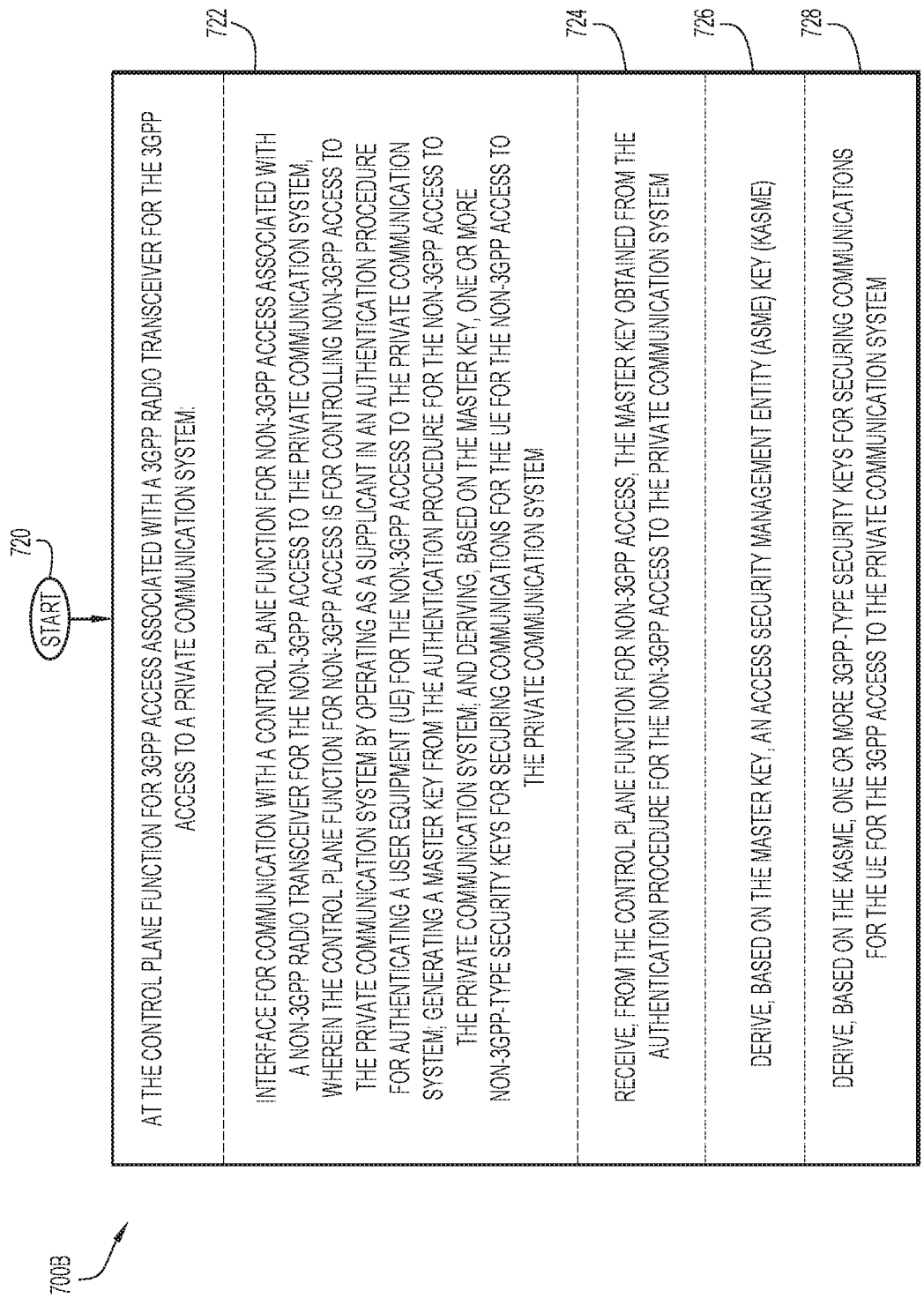
FIG. 7B is a flowchart for describing a method of providing authentication and secure communications in a private communication system having non-3GPP access and 3GPP access, which may be performed by a control plane function for 3GPP access of the UE, according to some implementations of the present disclosure.

FIG. 7B is a flowchart 700B for describing a method of providing authentication and secure communications for a UE in a private communication system having non-3GPP access and 3GPP access according to some implementations of the present disclosure. The method may be performed by a UE and, in particular, by a control plane function for 3GPP access associated with a 3GPP radio transceiver for the 3GPP access to a private communication system. See e.g. FIG. 5. In some implementations, the method of FIG. 7B may be considered to be the complement of the method of FIG. 7B involving the private communication system. The method may be embodied as a computer program product which includes a computer readable medium having instructions stored therein which are executed by one or more processors of the UE to perform the steps of the method.

Beginning at a start block 720 of FIG. 7B, the control plane function for 3GPP access may interface for communication with a control plane function for non-3GPP access associated with a non-3GPP radio transceiver for the non-3GPP access to the private communication system (step 722 of FIG. 7B). The control plane function for non-3GPP access is for controlling non-3GPP access to the private communication system by operating as a supplicant in an authentication procedure for authenticating a UE for the non-3GPP access to the private communication system; generating a master key from the authentication procedure for the non-3GPP access to the private communication system; and deriving, based on the master key, one or more non-3GPP-type security keys for securing communications for the UE for the non-3GPP access to the private communication system. With such processing, the UE may be associated with and successfully authenticated for non-3GPP access to the private communication system with secure communications.

The control plane function for 3GPP access of the UE may receive, from the control plane function for non-3GPP access, an indication indicating (e.g. successful) authentication of the UE in the authentication procedure for the non-3GPP access to the private communication system. 3GPP access to the private communication system may be permitted for the UE based on the (e.g. successful) authentication of the UE in the authentication procedure for the non-3GPP access to the private communication system. In some implementations, if authentication for non-3GPP access is successful, authentication and security procedures for the UE for 3GPP access may be entirely bypassed or abbreviated (e.g. skipping authentication steps and/or key generation steps, but perhaps involving simple checking of data items and/or calculations, etc.). The bypassing or abbreviation of authentication and security procedures for the UE for 3GPP access may occur in response to the UE's sending of a message indicating an attach request for registration (a registration message).

The control plane function for non-3GPP access may receive, from the control plane function for non-3GPP access, the master key obtained from the authentication procedure for the non-3GPP access to the private communication system (step 724 of FIG. 7B). The control plane function for non-3GPP access may derive, based on the master key, a $K_{ASME}$ (step 726 of FIG. 7B). The control plane function for non-3GPP access may derive, based on the $K_{ASME}$, one or more 3GPP-type security keys for securing communications for the UE for the 3GPP access to the private communication system (step 728 of FIG. 7B). Accordingly, the UE may be registered for 3GPP access to the private communications with secure communications.

In the methods of FIGS. 6A-6B and 7A-7B described above, the private communication system may include both a local private non-3GPP wireless network and a local private 3GPP network operative in a shared spectrum controlled according to a system for shared spectrum access (e.g. CBRS or other private spectrum). Alternatively, the private communication system may be or include a local private integrated non-3GPP and 3GPP network. See e.g. FIGS. 3A-3B and 4A-4B. Further, the non-3GPP access to the private communication system may involve IEEE 802.11 compliant network access, and the 3GPP access to the private communication system may involve 4G/LTE network access or 5G network access (e.g. 5G-NR).

Also in the methods of FIGS. 6A-6B and 7A-7B described above, for 3GPP access, the authentication procedure for 3GPP access may be an Evolved Packet System (EPS) Authentication and Key Agreement (AKA) (EPS-AKA) authentication procedure, where the EPS-AKA authentication procedure is bypassed for the UE when the 3GPP access to the private communication system is permitted based on the authentication for non-3GPP access. The one or more 3GPP-type security keys which are derived based on the $K_{ASME}$ may be or include AS security keys and NAS security keys. The NAS security keys may be or include $K_{nas-int}$ and $K_{nas-enc}$, and the AS keys may be or include $K_{eNB}$ (as well as $K_{rrc-int}$, $K_{rrc-enc}$, and $K_{up-enc}$).

In some implementations of FIGS. 6A-6B and 7A-7B, deriving the $K_{ASME}$ may be based on a relation:

$$K_{ASME} = hash(MSK|SN\text{-}ID),$$

where the SN-ID is a serving network ID of the private communication system. In CBRS implementations, the SN-ID may be SN-ID=PLMN ID+CBRS NID. In other implementations, the SN-ID may be SN-ID=PLMN ID+"network identifier" where the network identifier is for uniquely identifying the local private 3GPP network or enterprise network; alternatively, the network identifier may be excluded from the calculation.

Further in the methods of FIGS. 6A-6B and 7A-7B described above, for the non-3GPP access, the authentication procedure for the UE may be an Extensible Authentication Procedure (EAP) authentication procedure. Here, the master key which may be obtained may be a MSK, and deriving the one or more non-3GPP-type security keys based on the MSK may involve deriving a PMK, a PTK, a GMK, a GTK, or combinations thereof. Alternatively for the non-3GPP access, the authentication procedure for the UE may be a Pre-Shared Key (PSK) authentication procedure. Here, the master key which may be obtained may be a PSK, and deriving the one or more non-3GPP-type security keys based on the PSK may involve deriving a PMK, a PTK, a GMK, a GTK, or combinations thereof.

Specifically regarding IEEE 802.11 security, there are two security methods that are commonly utilized, referred to as Wi-Fi protected access (WPA)/WPA-2-PSK and WPA/WPA2-EAP. EAP involves authentication of clients with an IEEE 802.1x/EAP authentication procedure for validating relatively stringent credentials (e.g. certificates, username and password, and/or tokens) using an authentication server. Whether the security is WPA/WPA2-PSK or WPA/WPA2-EAP, once the client is validated, a process known as a WPA/WPA2 4-Way handshake may initiate key negotiation between the WLC/AP and the client using an MSK as the original key material. Briefly describing the process, an MSK may be derived from the EAP authentication phase when 802.1x/EAP security is used or from the PSK when WPA/WPA2-PSK is used. From the MSK, the client and WLC/AP may derive the PMK and the WLC/AP may generate the GMK. Once the two master keys are available, the client and the WLC/AP may initiate the WPA/WPA2 4-Way handshake using the master keys as seeds for negotiation of the security or encryption keys. The final security or encryption keys are known as the PTK and the GTK. The PTK is derived from the PMK and may be used to encrypt unicast frames with the client. The GTK is derived from the GMK and may be used to encrypt multicast/broadcast on a given S SID/AP.

Figure 8A:
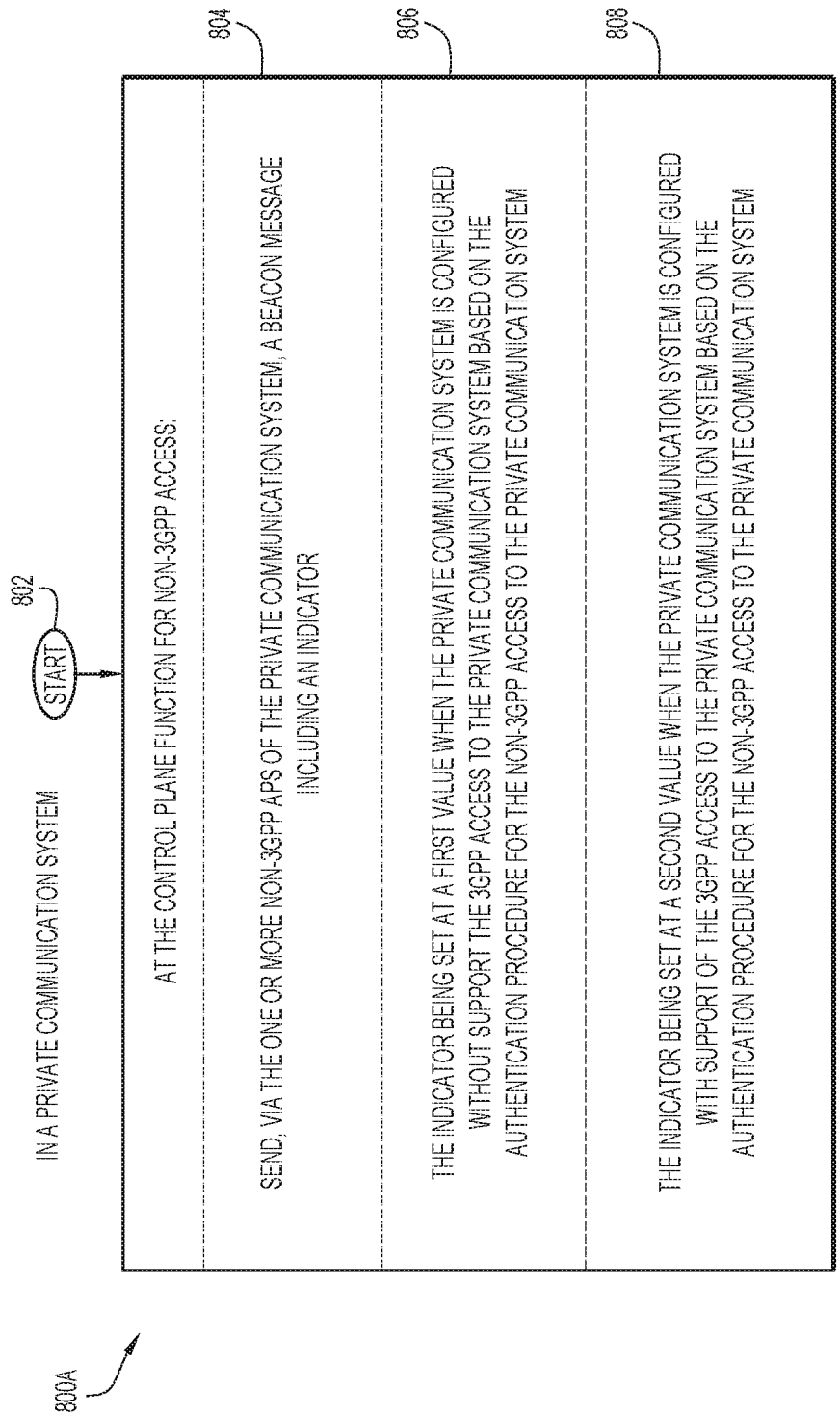
FIG. 8A is a flowchart for describing a method of advertising support of 3GPP access to a private communication system based on authentication for non-3GPP access to the private communication network, which may be performed by a control plane function for non-3GPP access in the private communication system, according to some implementations of the present disclosure.

FIG. 8A is a flowchart 800A for describing a method of advertising support of 3GPP access to a private communication system based on authentication for non-3GPP access according to some implementations of the present disclosure. The method of FIG. 8A may be performed by the private communication system, and in particular, by a control plane function for non-3GPP access in the private communication system. In some implementations, the method of FIG. 9A may be provided as part of the method of FIG. 6A, 6B, or 10A-10C. The method may be embodied as a computer program product which includes one or more computer readable mediums having instructions stored therein which are executed by one or more network nodes, such as a controller, a network function, an access point, a base station, etc., to perform steps of the method.

Beginning at a start block 802 of FIG. 8A, the control plane function for non-3GPP access may (regularly or periodically) send, via one or more non-3GPP APs of the private communication system, a beacon message or beacon frame including an indicator (step 804 of FIG. 8A). The sending of the beacon message or beacon frame may result in a broadcasting of the message. The indicator may be set at a first value when the private communication system is configured without support the 3GPP access to the private communication system based on the authentication procedure for the non-3GPP access (step 806 of FIG. 8A). The indicator may be set at a second value when the private communication system is configured with support of the 3GPP access to the private communication system based on the authentication procedure for the non-3GPP access (step 808 of FIG. 8A).

Figure 8B:
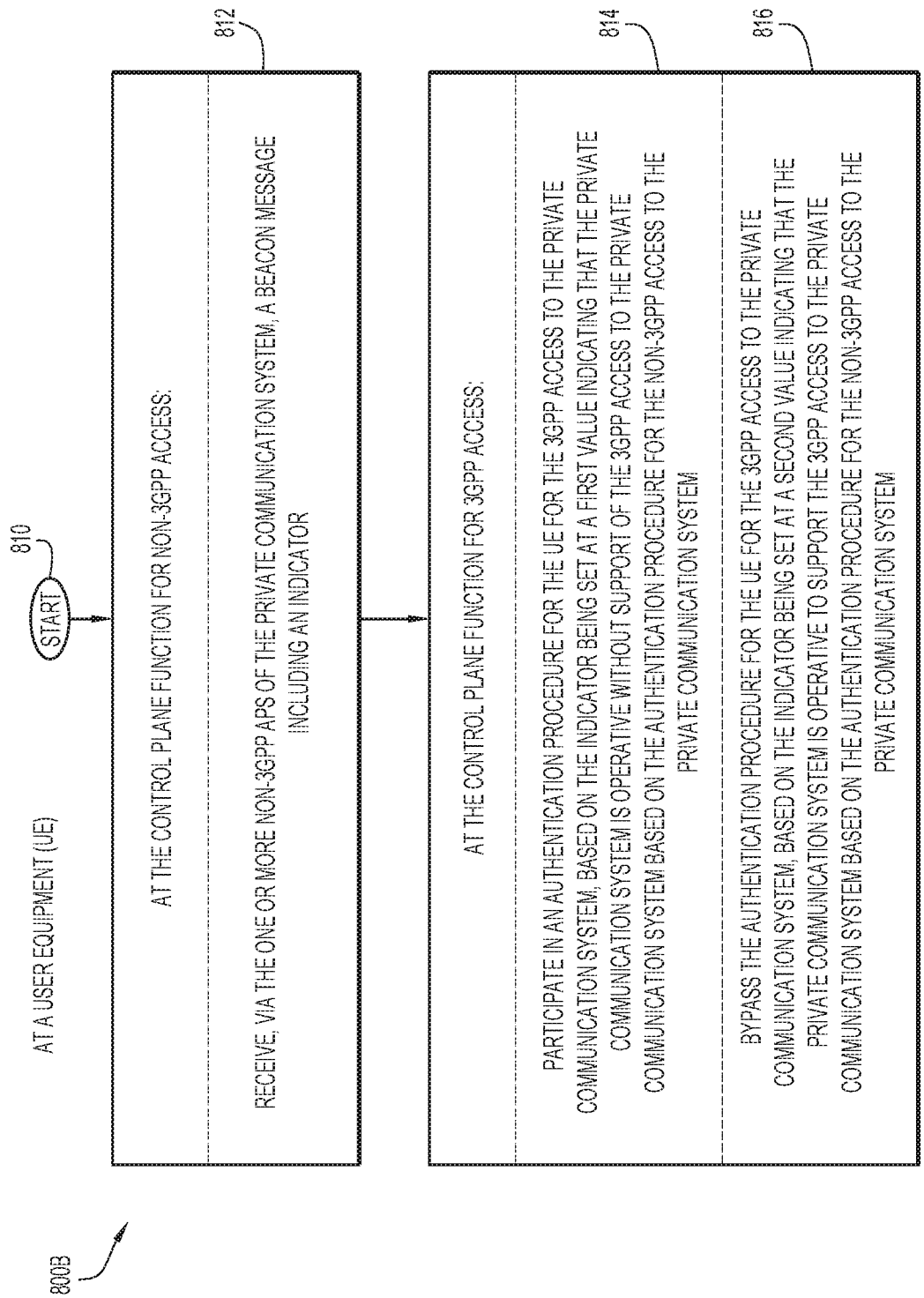
FIG. 8B is a flowchart for describing a method of providing authentication and secure communications in a private communication system, according to an advertised support of 3GPP access to the private communication system based on authentication for non-3GPP access to the private communication network, which may be performed by a UE, according to some implementations of the present disclosure.

FIG. 8B is a flowchart 800B for describing a method of providing authentication and secure communications for a UE in a private communication system, based on advertised support of 3GPP access to the private communication system based on authentication for non-3GPP access according to some implementations of the present disclosure. The method of FIG. 8B may be performed by a UE, and in particular, by a control plane function for non-3GPP access associated with a non-3GPP radio transceiver of the UE and at the control plane function for 3GPP access associated with a 3GPP radio transceiver of the UE. See e.g. FIG. 5. In some implementations, the method of FIG. 8B may be considered to be the complement of the method of FIG. 8A involving the private communication system. In some implementations, the method of FIG. 9A may be provided as part of the method of FIG. 7A, 7B, or 10A-10C. The method may be embodied as a computer program product which includes a computer readable medium having instructions stored therein which are executed by one or more processors of the UE to perform steps of the method.

Beginning at a start block 810 of FIG. 8B, the control plane function for non-3GPP access of the UE may receive, from the one or more non-3GPP APs of the private communication system, a beacon message or beacon frame including an indicator (step 812 of FIG. 8B). The beacon message or beacon frame may be broadcasted from the one or more non-3GPP APs. The control plane function for 3GPP access of the UE may participate in an authentication procedure (e.g. EPS-AKA authentication procedure) for the UE for the 3GPP access to the private communication system, based on the indicator being set at a first value indicating that the private communication system is operative without support of the 3GPP access to the private communication system based on the authentication procedure (e.g. EPS-AKA authentication procedure) for non-3GPP access (step 814 of FIG. 8B). On the other hand, the control plane function for 3GPP access of the UE may bypass the authentication procedure for the UE for the 3GPP access to the private communication system, based on the indicator being set at a second value indicating that the private communication system is operative to support the 3GPP access to the private communication system based on the authentication procedure for non-3GPP access (step 816 of FIG. 8B).

Figure 9A:
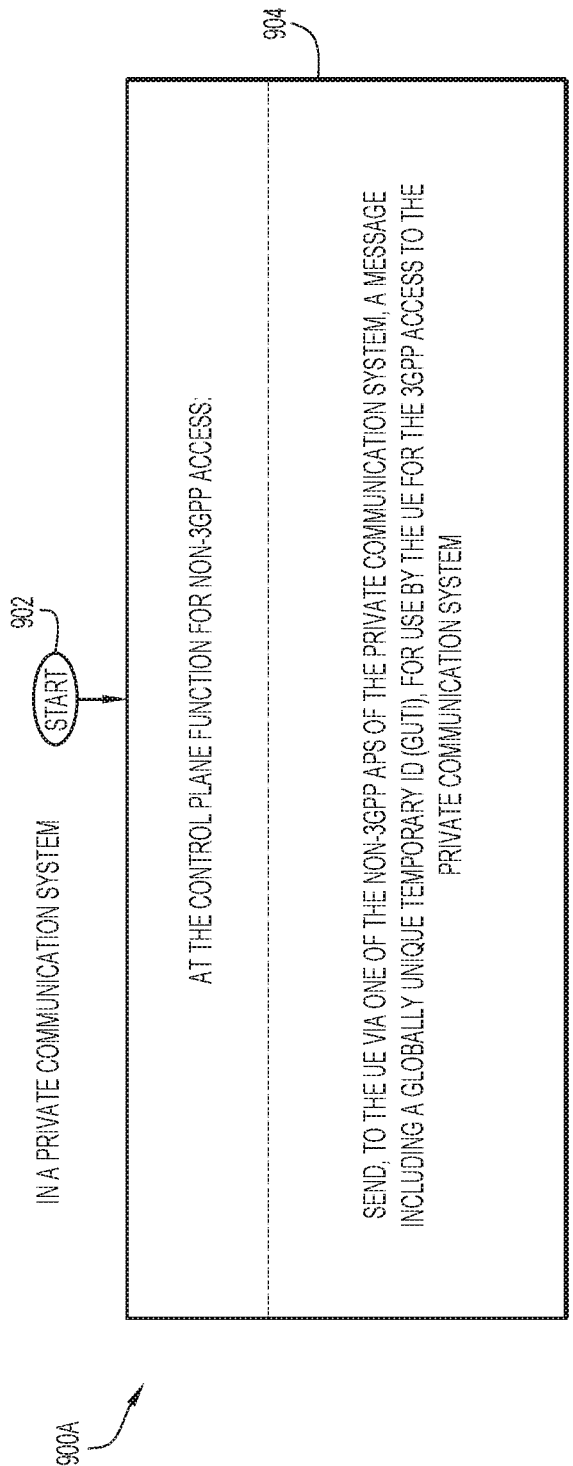
FIG. 9A is a flowchart for describing a method of providing secure communications in a private communication network, which may be performed by a control plane function for non-3GPP access in the private communication system, according to some implementations of the present disclosure.

FIG. 9A is a flowchart 900A for describing a method of providing secure communications for a UE in a private communication network according to some implementations of the present disclosure. The method of FIG. 9A may be performed by the private communication system, and in particular, by a control plane function for non-3GPP access in the private communication system. In some implementations, the method of FIG. 9A may be provided as part of the method of FIG. 6A, 6B, or 10A-10C. The method may be embodied as a computer program product which includes one or more computer readable mediums having instructions stored therein which are executed by one or more network nodes, such as a controller, a network function, an access point, a base station, etc., to perform steps of the method.

Beginning at a start block 902 of FIG. 9A, the control plane function for non-3GPP access may send, to the UE via one of the non-3GPP APs of the private communication system, a message including a Globally Unique Temporary ID (GUTI) (step 904 of FIG. 9A). In some implementations, the control plane function for non-3GPP access may send the message including the GUTI after successful authentication of the UE for non-3GPP access to the private communication system. In some implementations, the GUTI may be sent to the UE in a message indicating an EAP success to an EAP authentication procedure for non-3GPP access. The GUTI may be for subsequent use by the UE for the 3GPP access to the private communication system.

Figure 9B:
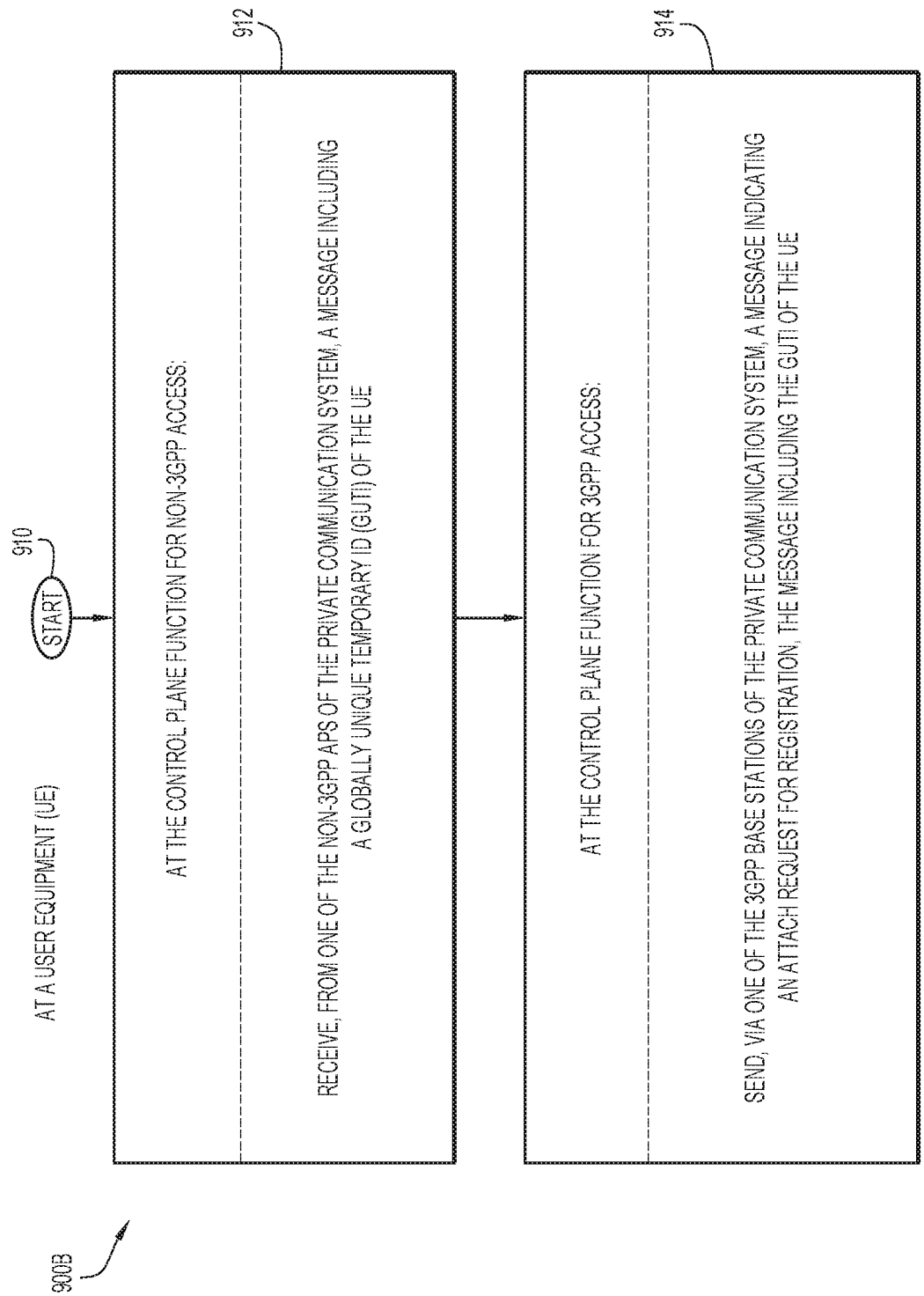
FIG. 9B is a flowchart for describing a method of providing secure communications in a private communication system, which may be performed by a UE, according to some implementations of the present disclosure.

FIG. 9B is a flowchart 900B for describing a method of providing secure communications for a UE in a private communication system according to some implementations of the present disclosure. The method of FIG. 9B may be performed by a UE, and in particular, by the control plane function for non-3GPP access associated with a non-3GPP radio transceiver of the UE and by the control plane function for 3GPP access associated with a 3GPP radio transceiver of the UE. See e.g. FIG. 5. In some implementations, the method of FIG. 9B may be considered to be the complement of the method of FIG. 9A involving the private communication system. In some implementations, the method of FIG. 9B may be provided as part of the method of FIG. 7A, 7B, or 10A-10C. The method may be embodied as a computer program product which includes a computer readable medium having instructions stored therein which are executed by one or more processors of the UE to perform steps of the method.

Beginning at a start block 910 of FIG. 9B, the control plane function for non-3GPP access of the UE may receive, from one of the non-3GPP APs of the private communication system, a message including a GUTI of the UE (step 912 of FIG. 9B). In some implementations, the control plane function for non-3GPP access may receive the message including the GUTI after successful authentication of the UE for non-3GPP access to the private communication system. In some implementations, the GUTI may be received by the UE in a message indicating an EAP success to an EAP authentication procedure for successful non-3GPP access. The control plane function for non-3GPP access may communicate the GUTI to the control plane function for 3GPP access. Subsequently, the control plane function for 3GPP access may send, to one of the 3GPP base stations of the private communication system, a message indicating an attach request for registration (step 914 of FIG. 9B). The message may include the GUTI of the UE.

Figure 13:
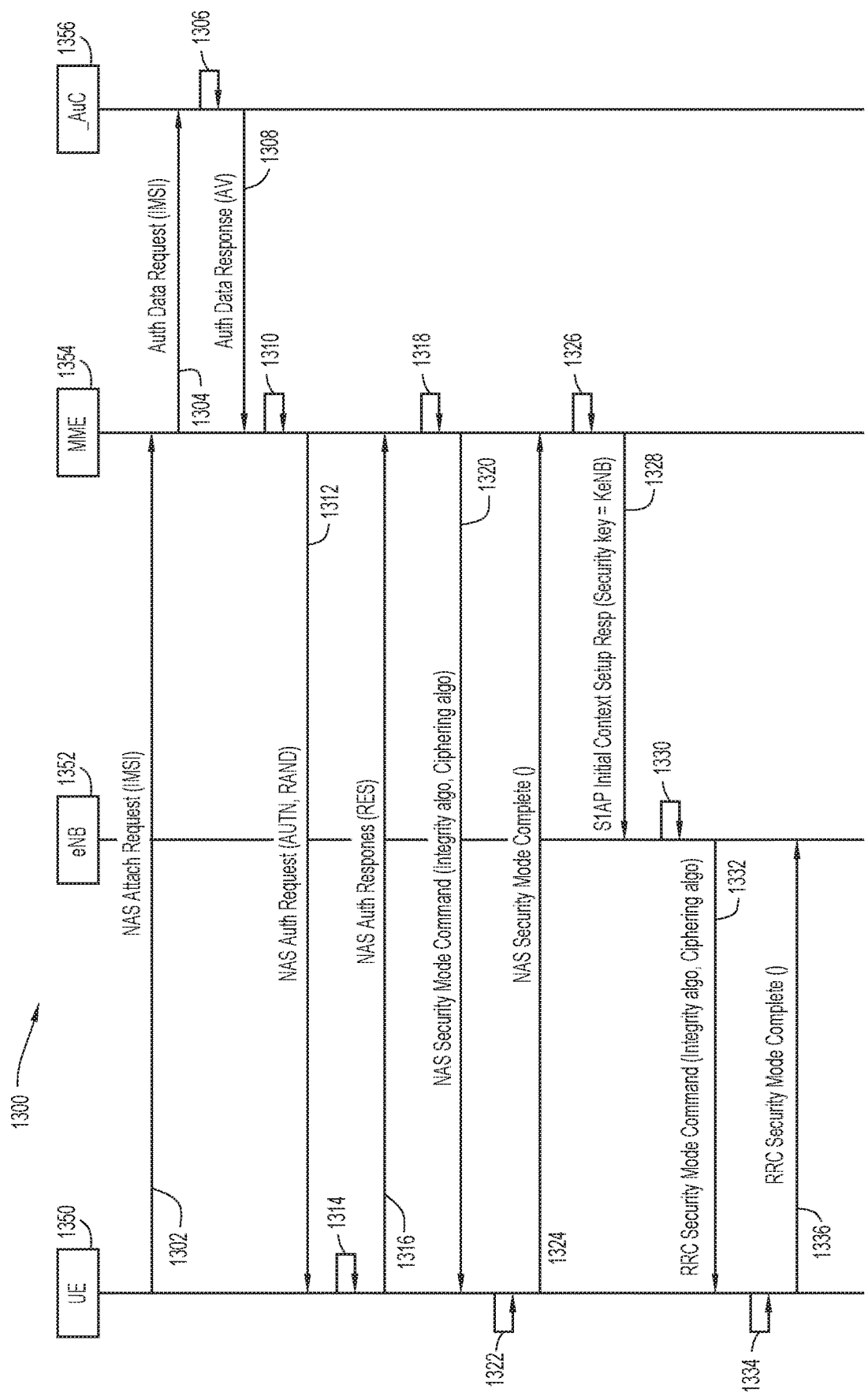
FIG. 13 a call flow diagram of a call flow for traditional authentication and key generation for a traditional Long-Term Evolution (LTE) security architecture, for showing one more messaging and processing steps related to security which may be bypassed according to some implementations.

With reference now ahead to FIG. 13, a call flow diagram 1300 of a call flow for traditional authentication and key generation for a traditional LTE security architecture is shown. Call flow diagram 1300 of the call flow for authentication and key generation is shown to indicate one or more messaging and processing steps related to security which may be bypassed according to techniques of the present disclosure, as well as for comparison purposes. 3GPP Technical Specification (TS) 33.401 specifies LTE security architecture. EPS-AKA may be used for authentication and key agreement procedures over Evolved-UMTS Terrestrial Radio Access Network (E-UTRAN).

The procedure for authentication and key generation is first described in brief. In the USIM of the UE and in a HSS of the network, a permanent key and the IMSI may be pre-provisioned and used for generating the $K_{ASME}$ (a top level key) and various other keys (i.e. using the EPS-AKA procedure). The procedure may involve two general processes: (1) the HSS, with a subscriber profile and SIM credentials, may generate EAP authentication vectors and deliver them to the MME. For example, Random Number (RAND), Authentication Token (AUTN), Expected Response (XRES), and $K_{ASME}$ may be produced; (2) the MME may select one of the authentication vectors and use it for mutual authentication with the UE that shares the same key. Once the root key is generated, the network and the UE will be able to derive other keys, each having a different usage scope.

Now, more specifically in FIG. 13, the LTE security architecture includes a UE 1350, an eNB 1352, an MME 1354, and an authentication center (AuC) 1356. NAS signaling may be utilized for messaging between UE 1350 and MME 1354. To begin, UE 1350 may send to MME 1354 a message indicating an attach request (step 1302 of FIG. 13). The message may include the IMSI of UE 1350. In response, MME 1354 may send to AuC 1356 a message indicating an authentication data request to request authentication vectors associated with the IMSI (step 1304 of FIG. 13). AuC 1356 (and/or an HSS) may fetch a pre-shared key associated with the IMSI and calculate authentication vectors (AV) using the pre-shared key (step 1306 of FIG. 13). AuC 1356 may send back to MME 1354 a message indicating an authentication data response (step 1308 of FIG. 13). The message may include the calculated AV. MME 1354 may retrieve IK, CK, XRES, RAND and AUTN from the AV (step 1310 of FIG. 13). MME 1354 may send back to UE 1350 a message indicating an authentication request which includes the AUTN and the RAND (step 1312 of FIG. 13). UE 1350 may authenticate the network by checking the received AUTN and calculate IK, CK, RES, XMAC from a UE security key (in USIM), Authentication Management Field (AMF), Operator-specific parameter (OP), the AUTN, and the RAND (step 1314 of FIG. 13). UE 1350 may send back to MME 1354 a message indicating an authentication response which includes the RES (step 1316 of FIG. 13). MME 1354 may perform processing (step 1318 of FIG. 13), which includes comparing the received RES with XRES and, if there is a match, then authentication is successful; otherwise authentication has failed and MME 1354 sends an authentication failure message to UE 1350. MME 1354 may also reset a downlink NAS count. Further, MME 1354 may calculate $K_{ASME}$, $K_{eNB}$, $K_{nas-int}$, and $K_{nas-enc}$.

After such processing in step 1318 of FIG. 13, MME 1354 may send to UE 1350 a message indicating a NAS security mode command with integrity protected but not ciphered, using $K_{nas-inc}$ (step 1320 of FIG. 13). This message may include an integrity algorithm, a ciphering algorithm, a NAS key set ID, and UE security capability. UE 1350 may calculate $K_{ASME}$, $K_{eNB}$, $K_{nas-int}$, and $K_{nas-enc}$ (step 1322 of FIG. 13). UE 1350 may send back to MME 1354 a message indicating a NAS security mode complete with integrity protected and ciphered (step 1324 of FIG. 13). MME 1354 may receive and process the message from UE 1350 (step 1326 of FIG. 13). MME 1354 then may send to eNB 1352 a message indicating an S1AP initial context setup request and including the $K_{eNB}$ (step 1328 of FIG. 13). The eNB 1352 may receive the message and calculate $K_{rrc-int}$, $K_{rrc-enc}$, and $K_{up-enc}$ based on the received $K_{eNB}$ (step 1330 of FIG. 13). The eNB 1352 may then send to UE 1350 a message indicating a Radio Resource Control (RRC) security mode command and including an AS integrity algorithm and an AS ciphering algorithm (step 1332 of FIG. 13). UE 1350 may calculate $K_{rrc-int}$, $K_{rrc-enc}$, and $K_{up-enc}$ responsive to the message (step 1334 of FIG. 13). UE 1350 may send back to the eNB 1352 a message indicating an RRC security mode complete (step 1336 of FIG. 13). After these steps, all NAS and AS messages will be integrity protected and ciphered, except for user plane traffic which is only ciphered.

Again, what are provided are techniques and mechanisms for use in efficient authentication and secure communications in private communication systems which provide both non-3GPP access and 3GPP access. In some implementations, permission may be granted to a UE for 3GPP access to the private communication system based on an indication indicating authentication of the UE in the authentication procedure for the non-3GPP access, and this may include bypassing or abbreviating the authentication procedure for the UE for 3GPP access. This may also include the generation of 3GPP-type keys based on key material from the authentication for the UE for the non-3GPP access.

In at least some preferred implementations, techniques and mechanisms of the present disclosure may be used together in an effort to unify service layers of co-located non-3GPP and 3GPP networks (e.g. Wi-Fi and private LTE) in a private communication system of an enterprise. In some implementations, one objective may be to substantially reduce or eliminate the need for 3GPP core functionality (e.g. LTE functionality) in enterprise deployments.

Figure 10A:
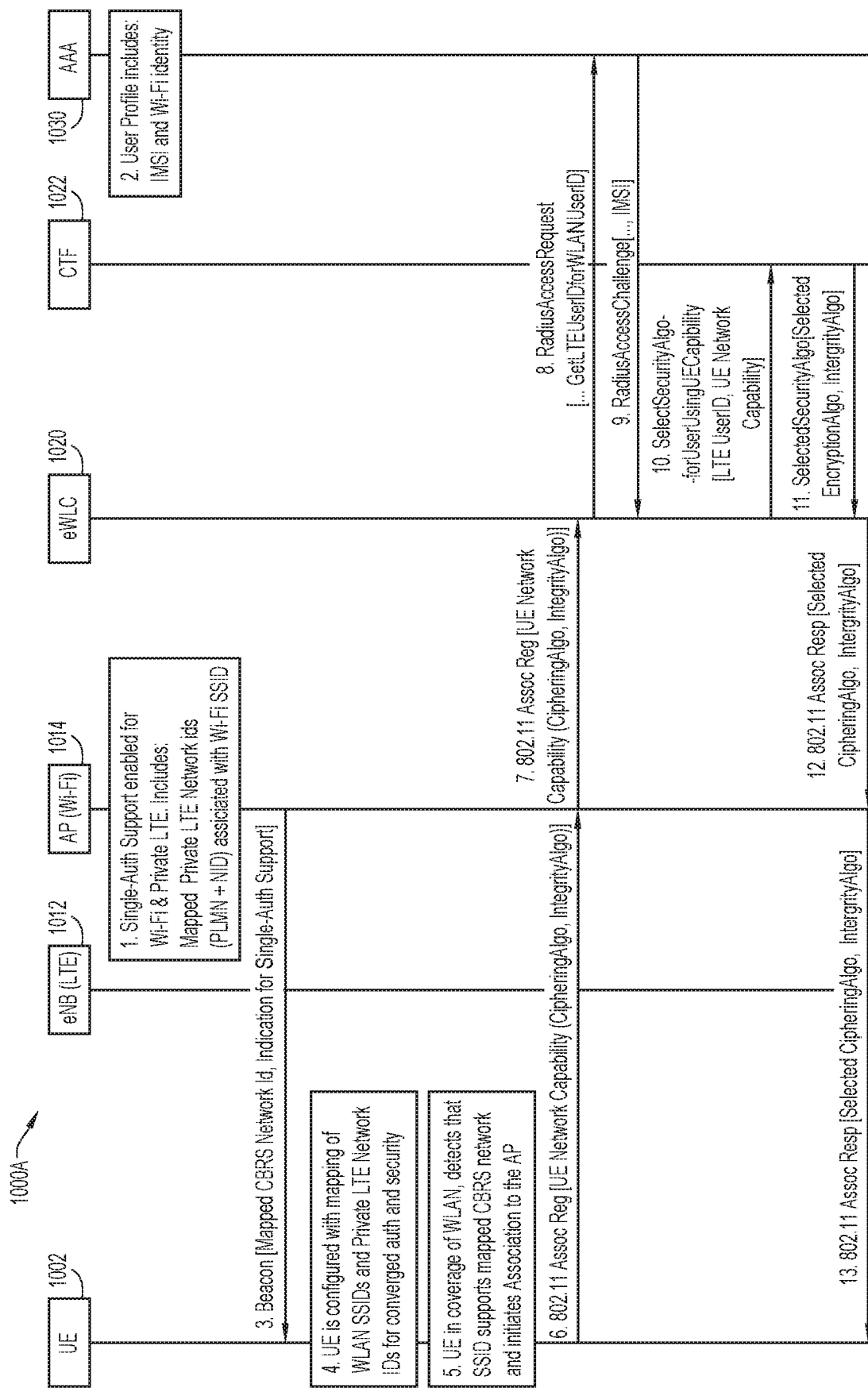
FIGS. 10A-10C are call flow diagrams forming a call flow for describing an example end-to-end method of providing authentication and secure communications in a private communication system having non-3GPP access and 3GPP access according to some implementations of the present disclosure.
Figure 10B:
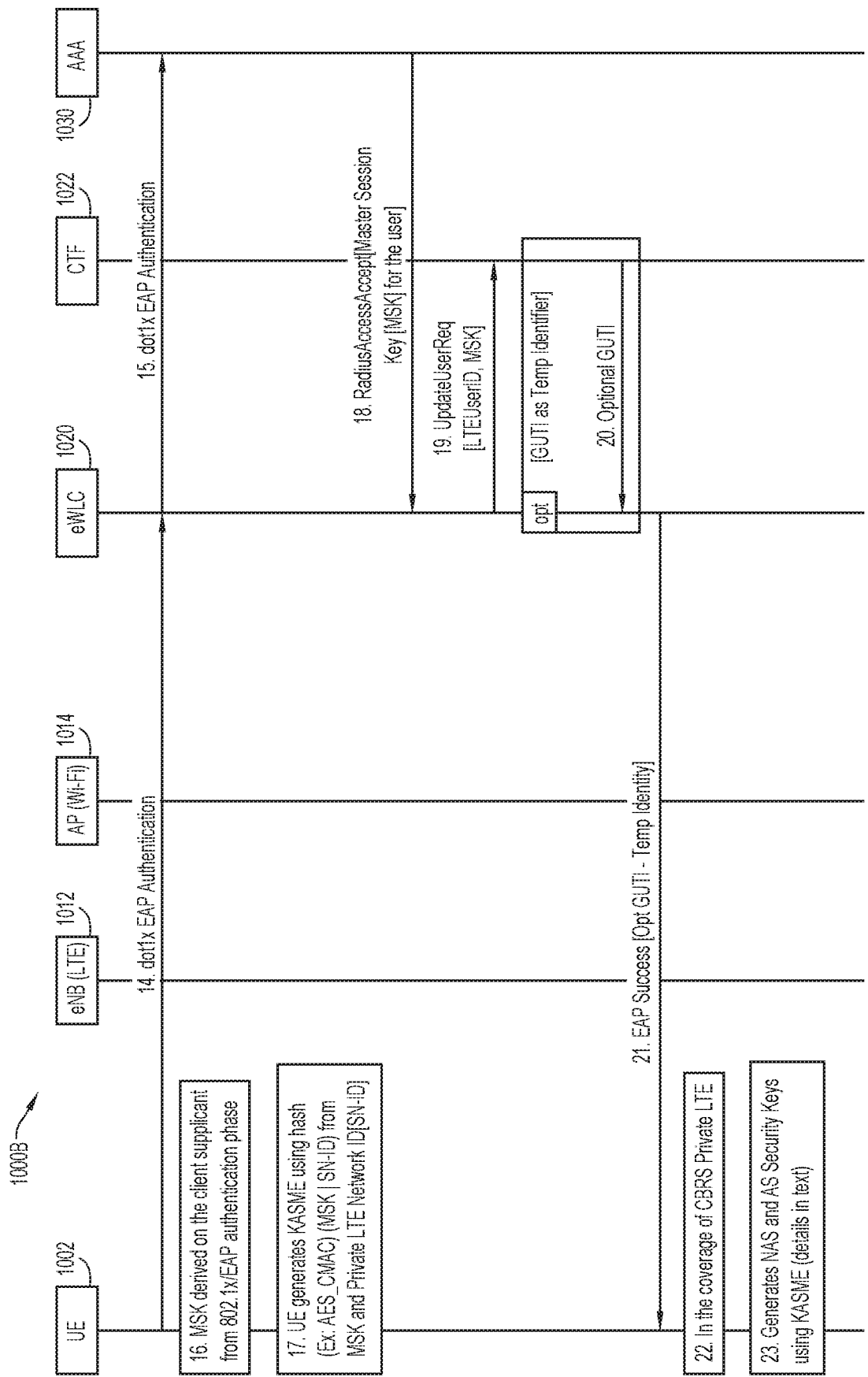
Figure 10C:
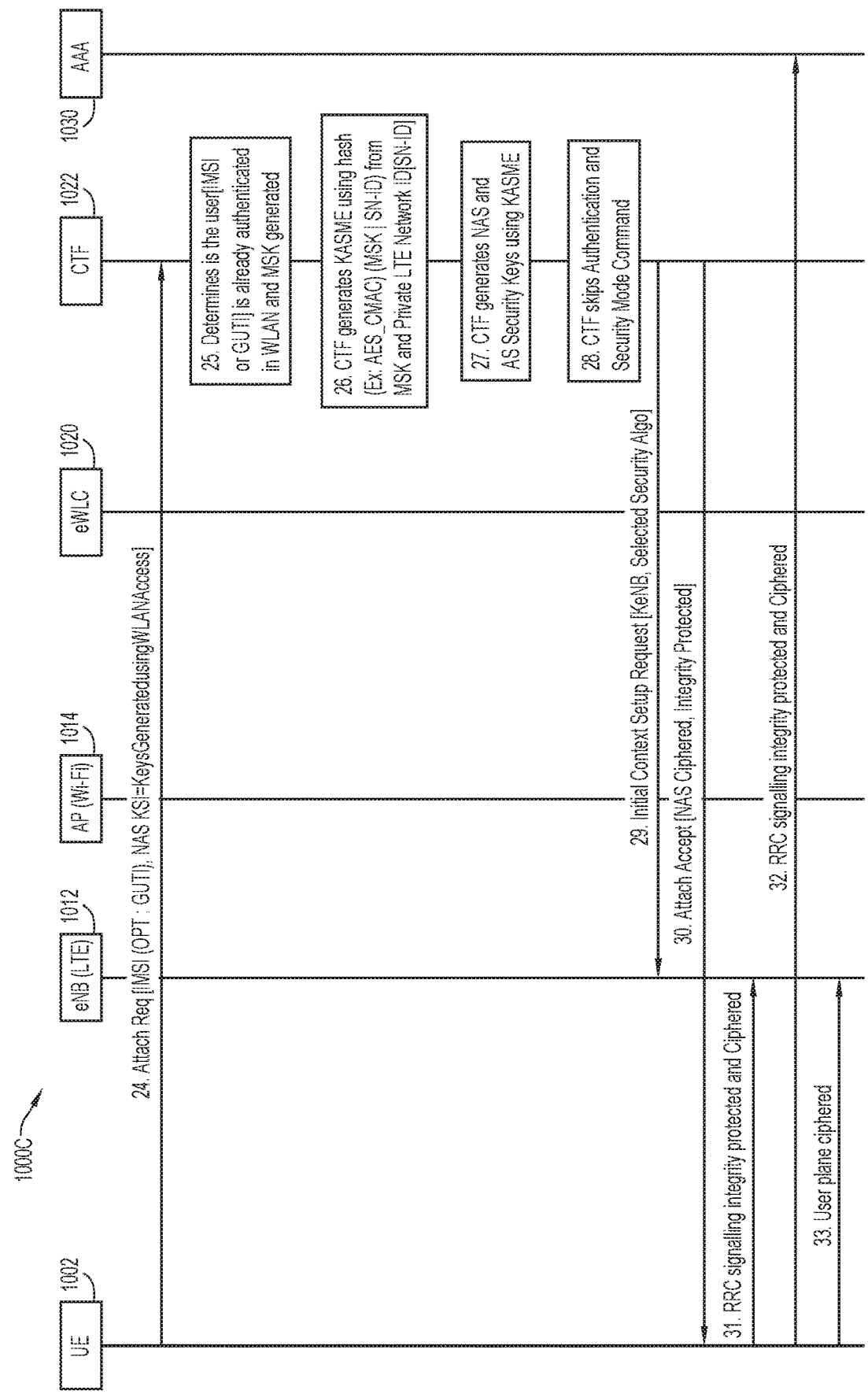

To that end, FIGS. 10A-10C are call flow diagrams 1000A, 1000B, and 1000C forming a call flow for describing an example of a more detailed, end-to-end method of providing authentication and secure communications in a private communication system having non-3GPP access and 3GPP access according to some implementations of the present disclosure. To simplify explanation of the call flow of FIGS. 10A-10C, although an integrated Wi-Fi and private LTE network is provided, the private communication system is described as providing non-3GPP access in relation to a Wi-Fi network and 3GPP access in relation to a private LTE network.

Illustrated in the call flow of FIGS. 10A-10C are pertinent, select nodes or functions of a network infrastructure of a private communication system of an enterprise. The select nodes or functions of the network infrastructure may include an eNB 1012 (for private LTE), an AP 1014 (for Wi-Fi), an enhanced WLC (eWLC) 1020, a cellular termination function (CTF) 1022 (alternatively referred to as an LTE termination function or "LTF"), and an AAA server 1030. Here, AP 1014 and eWLC 1020 are utilized for non-3GPP access and eNB 1012 and CTF 1022 are utilized for 3GPP access. In this example, the control plane function for non-3GPP access may be a part of AP 1014 and/or eWLC 1020, whereas the control plane function for 3GPP access may be part of CTF 1022. For 3GPP access, CTF 1022 may be considered as or include an interworking function, being a derivative of an MME with standard interfaces (e.g. an S1-MME for NAS termination) towards UE 1002 and eNB 1012. All other LTE functions and backend interfaces may be completely eliminated, if not greatly reduced, in functionality and/or number.

Accordingly, in some implementations, the network infrastructure of the private communication system of FIGS. 10A-10C may be or be considered to be a "unified" Wi-Fi and private LTE network and therefore may be referred to merely as the "network."

In some implementations, extensions to Wi-Fi access authentication for private LTE key generation as well as IMSI privacy protection are provided. Here, an optimization may be made to authentication steps for deployments where Wi-Fi and private LTE provide access to a common network or set of services. Wi-Fi authentication procedures may be extended to have both the UE and the network generate key material for LTE security. Here, a technique where the UE performs a single authentication via the network over Wi-Fi may be provided, resulting in both the UE and the network generate the needed security states for both Wi-Fi and private LTE. When the UE is in coverage of a private LTE network collocated with a Wi-Fi network to which it has completed authentication, the entire LTE authentication procedure may be eliminated or greatly reduced in functionality or in the number of steps.

In some implementations, the techniques and mechanisms may help alleviate a known LTE security threat, i.e. the leaking of the IMSI of the UE in the initial Attach procedure. Here, upon completing Wi-Fi authentication, the network may generate a GUTI which the UE may present in the LTE attach procedure. This may eliminate IMSI exposure, thereby making the authentication compliant with General Data Protection Regulation (GDPR).

The following are stated assumptions of the techniques and mechanisms associated with the call flow of FIGS. 10A-10C. A control plane function for facilitating 3GPP access (e.g. an MME or a variant thereof, such as CTF 1022 terminating the S1-MME interfaces) may be collocated with a Wi-Fi control plane function (e.g. eWLC 1020) with an interworking between the functions. In some implementations, CTF 1022 may be configured with functionality associated with an MME, an SGW, and/or a PGW for 4G/LTE; or functionality associated with an AMF and/or SMF for 5G; or functionality associated with a future generation or version of 3GPP hereinafter developed.

AAA server 1030 of the enterprise may have one or more subscriber profiles, each having an identity used for Wi-Fi access authentication and an IMSI associated with a subscriber of the UE in the private LTE network. UE 1002 and the Wi-Fi network of the enterprise may be pre-configured for "single" authentication support, together with network identifier mappings for Wi-Fi-to-private LTE networks. Here, for each Wi-Fi SSID, a network identifier corresponding to the private LTE network may be provided. For example, SSID "Blizzard" for Company A may map to a CBRS Common PLMN ID (e.g. "315-010") and NID value allocated to Company A. These mappings may be pre-configured (e.g. to avoid any new security threats).

To begin with reference to the call flow diagram 1000A of FIG. 10A, AP 1014 is configured with support of "single" authentication for Wi-Fi and private LTE access and this support is enabled (step 1 of FIG. 10A). AP 1014 and/or eWLC 1020 may have a stored mapping between a SSID of AP 1014 and a network identifier for the private LTE network or SN-ID, where SN-ID=PLMN ID+CBRS NID. Also, AAA server 1030 may store user profiles associated with UEs, where each user profile includes a stored association (e.g. a binding) between a Wi-Fi identity of the UE and the IMSI of the UE (step 2 of FIG. 10A). More generally, the stored associations of bindings may be considered to be between a first user identity (e.g. a non-3GPP identity) for non-3GPP access and a second user identity (e.g. a 3GPP identity) for 3GPP access.

During operation, AP 1014 may (regularly or periodically) send a beacon message or beacon frame including one or more information elements (step 3 of FIG. 10A). The sending of the beacon message or beacon frame may result in a broadcasting of the message. One of the information elements may be the SSID of AP 1014. In some implementations, one or more of the information elements may further indicate presence of the private LTE network in association with the SSID or AP 1014. In some implementations, one or more information elements which may indicate presence of private LTE network may include one or more of an indicator (e.g. a bit indicator) indicating the presence of the private LTE network, a PLMN ID which identifies the private LTE network, a frequency channel for use in the private LTE network, and a cell identifier associated with the private LTE network.

In some implementations, one or more of the information elements may further indicate whether or not the network is configured with support of private LTE access to the network based on authentication for Wi-Fi access. This may be referred to as support of "single" authentication for Wi-Fi and private LTE access. The indicator may be set at a first value when the network is configured without support the private LTE access to the network based on authentication for Wi-Fi access. Alternatively, the indicator may be set at a second value when the network is configured with support of the private LTE access to the network based on authentication for Wi-Fi access.

When the network is configured with support of private LTE access based on authentication for Wi-Fi access (or "single" authentication for Wi-Fi and private LTE access), then one of the information elements may further include the network identifier or SN-ID associated with the network.

Similar to AP 1014, UE 1002 may be configured with support of "single" authentication for Wi-Fi and private LTE access, and have a stored mapping between the SSID of AP 1014 and the network identifier or the SN-ID associated with the network and/or private LTE access (step 4 of FIG. 10A). While in coverage with AP 1014, UE 1002 may compare the received SSID from AP 1014 with prestored SSIDs stored in a SSID list of UE 1002 and, upon identifying a matching SSID, initiate procedures for association and authentication in the Wi-Fi network (step 5 of FIG. 10A).

In particular, UE 1002 may send to AP 1014 a message indicating an association request (step 6 of FIG. 10A). The message may include the Wi-Fi identity associated with UE 1002. In some implementations, the message may further include a UE network capability for ciphering and integrity for private LTE access. AP 1014 may receive this message, and forward to eWLC 1020 a corresponding message having the same information (step 7 of FIG. 10A). In response, eWLC 1020 may interact with AAA server 1030. More particularly, eWLC 1020 may send to AAA server 1030 a message indicating a radius access request (step 8 of FIG. 10A). This message may include the Wi-Fi identity (i.e. the first user identity) of UE 1002 and further indicate a request for the IMSI (i.e. the second user identity) of UE 1002 based on the Wi-Fi identity. In response, AAA server 1030 may return to eWLC 1020 a message indicating a radius access challenge (step 9 of FIG. 10A). The message may include information related to the radius access request as well as the IMSI (i.e. the second user identity) of UE 1002.

The eWLC 1020 may then send to CTF 1022 a message indicating a request to select a security algorithm (step 10 of FIG. 10A). The message may include the IMSI and the UE network capability. CTF 1022 may select an appropriate security algorithm and send back to eWLC 1020 a message including the selected encryption algorithm and integrity algorithm (step 11 of FIG. 10A). The eWLC 1020 may send back to AP 1014 a message indicating an association response (step 12 of FIG. 10A). The message may include the selected encryption algorithm and integrity algorithm. AP 1014 may receive this message, and forward to UE 1002 a corresponding message having the same information, namely the selected encryption algorithm and integrity algorithm (step 13 of FIG. 10A).

Continuing now with reference to the call flow diagram 1000B of FIG. 10B, UE 1002 may receive the message indicating the association response and, in response, send to eWLC 1020 a message indicating IEEE 802.1x/EAP authentication for an EAP authentication procedure which involves AAA server 1030 (steps 14 and 15 of FIG. 10B). The eWLC 1020 serves as the authenticator in the EAP authentication procedure. UE 1002 may derive the MSK (step 16 of FIG. 10B). In addition, UE 1002 may generate the $K_{ASME}$ based on the MSK (step 17 of FIG. 10B). More specifically, UE 1002 may generate the $K_{ASME}$ based on the relation $K_{ASME}$=hash function (MSK|SN-ID). Note that UE 1002 may have the network identifier or SN-ID from its stored profile or as received from the Wi-Fi network. In some implementations, the hash function may be AES_CMAC; in alternative implementations, a different hash function suitable for generation of the $K_{ASME}$ may be used.

The AAA server 1030 may separately and independently derive the MSK, and send to eWLC 1020 a message indicating a radius access accept which includes the MSK (step 18 of FIG. 10B). Thus, the MSK may be shared with the authenticator (i.e. eWLC 1020) by AAA server 1030. Wi-Fi-type security keys based on the MSK may be generated or derived by UE 1002 and on the network side (e.g. PMK, PTK, GMK, GTK, or combinations thereof).

The eWLC 1020 may send to CTF 1022 a message indicating a request to update user information (step 19 of FIG. 10B). The message may include the IMSI of UE 1002 and the MSK for UE 1002. In response, CTF 1022 may obtain or generate a temporary identifier or GUTI of UE 1002, and send to eWLC 1020 a message which includes the temporary identifier or the GUTI of UE 1002 (step 20 of FIG. 10B). The eWLC 1020 may send to UE 1002 a message indicating an EAP success which indicates successful authentication (step 21 of FIG. 10B). The message may include the GUTI of UE 1002. UE 1002 is now associated with AP 1014 and fully authenticated in the Wi-Fi network with secure communications.

Being in coverage with the private LTE network, UE 1002 may discover or otherwise identify the presence of the private LTE network (e.g. based on an indicated presence as described) (step 22 of FIG. 10B). UE 1002 may generate one or more private LTE-type security keys, e.g. the NAS and AS security keys (step 23 of FIG. 10B). More specifically, UE 1002 may use the $K_{ASME}$, as well as the network-provided and selected integrity and encryption algorithms, to proceed with NAS and AS security setup. In the NAS security setup, the $K_{ASME}$, the network-selected NAS ciphering algorithm, and the NAS integrity algorithm are used to generate $K_{nas-int}$ and $K_{nas-enc}$. In particular, $K_{nas-int}$=KDF ($K_{ASME}$, NAS-int-alg, Alg-ID) and $K_{nas-enc}$=KDF ($K_{ASME}$, NAS-enc-alg, Alg-ID), where KDF is a key derivation function. In the AS security setup, three (3) general process steps may be performed. In particular, the $K_{ASME}$ and a NAS count from a USIM of UE 1002 may be used to generate the $K_{eNB}$ (a process step A). The $K_{eNB}$, the network-selected RRC ciphering algorithm, and the RRC Integrity Algorithm may be used to generate $K_{rrc-int}$ and $K_{rrc-enc}$ (a process step B). Here, $K_{rrc-int}$=KDF ($K_{eNB}$, RRC-int-alg, Alg-ID) and $K_{rrc-enc}$=KDF ($K_{eNB}$, RRC-enc-alg, Alg-ID). Then, the $K_{eNB}$ and the network-selected UP ciphering algorithm may be used to generate $K_{up-enc}$, where $K_{up-enc}$=KDF ($K_{eNB}$, UP-enc-alg, Alg-ID) (a process step C).

Continuing now with reference to the call flow diagram 1000C of FIG. 10C, UE 1002 may send via eNB 1012 to CTF 1022 a message indicating an attach request for registration (step 24 of FIG. 10C). The message may include the GUTI of UE 1002 previously received in relation to step 21 of FIG. 10B. The message may further include an indicator indicating that authentication in the Wi-Fi network has been performed. More specifically, the message may include a NAS key set identifier (KSI) indicating that UE 1002 already has NAS and AS security keys generated, and that the network may skip authentication and security mode procedures for private LTE access (e.g. the NAS and AS setup steps). In response, CTF 1022 may perform a check to determine whether the user (e.g. based on IMSI or GUTI) has already been authenticated in the Wi-Fi network (step 25 of FIG. 10C). This check may be performed based on a stored indicator or the like. Also, CTF 1022 may determine whether the MSK associated with UE 1002 has already been generated.

If the check is successful (i.e. authentication has been performed and/or the MSK has been generated), CTF 1022 may derive or generate the $K_{ASME}$ based on the MSK, or more particularly based on the relation $K_{ASME}$=hash function (MSK|SN-ID) (step 26 of FIG. 10C). CTF 1022 may generate the NAS and AS security keys based on the $K_{ASME}$ (step 27 of FIG. 10C). CTF 1022 may cause the private LTE network to skip the standard authentication and security mode procedures (e.g. NAS and AS setup steps) for 3GPP access (step 28 of FIG. 10C). In particular, procedures relating to the RRC security mode command may be bypassed.

CTF 1022 may send to eNB 1012 a message indicating an initial context setup request (step 29 of FIG. 10C). The message may include the $K_{eNB}$ for the generation of keys (i.e. $K_{rrc-int}$, $K_{rrc-enc}$, and $K_{up-enc}$) at eNB 1012 using the $K_{eNB}$ and the selected security algorithms (ciphering and integrity algorithms, including an RRC ciphering algorithm, an RRC integrity algorithm and a UP ciphering algorithm). UE 1002 may send via eNB 1012 to CTF 1022 a message indicating an attach accept (step 30 of FIG. 10C). The attach accept may be inside the S1-AP initial context setup having the $K_{eNB}$ for eNB 1012 and the selected ciphered and integrity algorithms. The NAS message may be ciphered and integrity protected. RRC signaling between UE 1002 and eNB 1012 may also be integrity protected and ciphered (step 31 of FIG. 10C). NAS signaling between UE 1002 and CTF 1022 may also be integrity protected and ciphered (step 32 of FIG. 10C). User plane traffic between UE 1002 and eNB 1012 may also be ciphered but not integrity protected (step 33 of FIG. 10C).

In some implementations, the hash function used for the generation of the $K_{ASME}$ may be AES_CMAC. In alternative implementations, a different hash function suitable for generation of the $K_{ASME}$ may be used.

In one variation of the above-described technique, the Wi-Fi network may return the RAND & AUTN parameters (e.g. obtained from the HSS) in the EAP success message to UE 1002 (see previous step 21). The UE 1002 may verify the AUTN with locally-generated AUTNue. Along with this, the UE 1002 may generate the RES which may be exchanged with the private LTE network in the message indicating the attach request (see previous step 24). The RES may be used by CTF 1022 to complete a mutual authentication, by comparing the RES with XRES. In this variation, an additional layer of mutual authentication which relies on RAND & AUTN generated at the HSS and shared with UE 1002 through the Wi-Fi network.

As described above, the GUTI may be generated during the EAP authentication phase and sent to UE 1002 from the eWLC 1020 in the message indicating EAP success (see previous step 21). The GUTI may then be used by the UE 1002 in the message indicating the attach request for registration (see previous step 24). This technique involving the network-generated GUTI and associated messaging makes UE access more secure. In some implementations, the IMSI of UE 1002 is not (e.g. or never) shared and hence more security is provided for the network. The extensions prevent IMSI exposure, which is a currently known threat in LTE access, and also makes the network compliant to GDPR regulation.

As described above, the MSK generated during the authentication procedure for non-3GPP access may be used to generate the $K_{ASME}$ for 3GPP access security in the private LTE network for 4G. For 5G key generation, a similar approach may be taken. In some implementations for 5G, the MSK may be generated during the authentication procedure for non-3GPP access, the MSK may be received and used to generate the $K_{ASME}$ as described, and the generated $K_{ASME}$ may be used to generate a $K_{AMF}$ for 5G. The $K_{AMF}$ may be used for deriving one or more 3GPP-type security keys for 5G. Note that keys should be provided with uniqueness on an access basis (i.e. the keys have to be different for each one of the accesses).

In some implementations, the MSK and an access-specific identifier may be utilized for generating 4G-type security keys or 5G-type security keys. In these implementations, $K_{ASME}$=MSK+4G-specific Network ID; and $K_{AMF}$=MSK+5G-specific Network ID In a variation of these implementations, the NID portion of the SN-ID may be different from 4G and 5G as well. For example:

$K_{ASME}$=(MSK|SN-ID|"4G"); and $K_{AMF}$=(MSK|SN-ID|"5G").

In some variants to this approach, an NID portion of the SN-ID may be different for 5G versus 4G. Here, for example:

$K_{ASME}$=(MSK|SN-ID); and $K_{AMF}$=(MSK|SN-ID), where the SN-ID (i.e. the NID portion) is different for 5G versus 4G.

Figure 11:
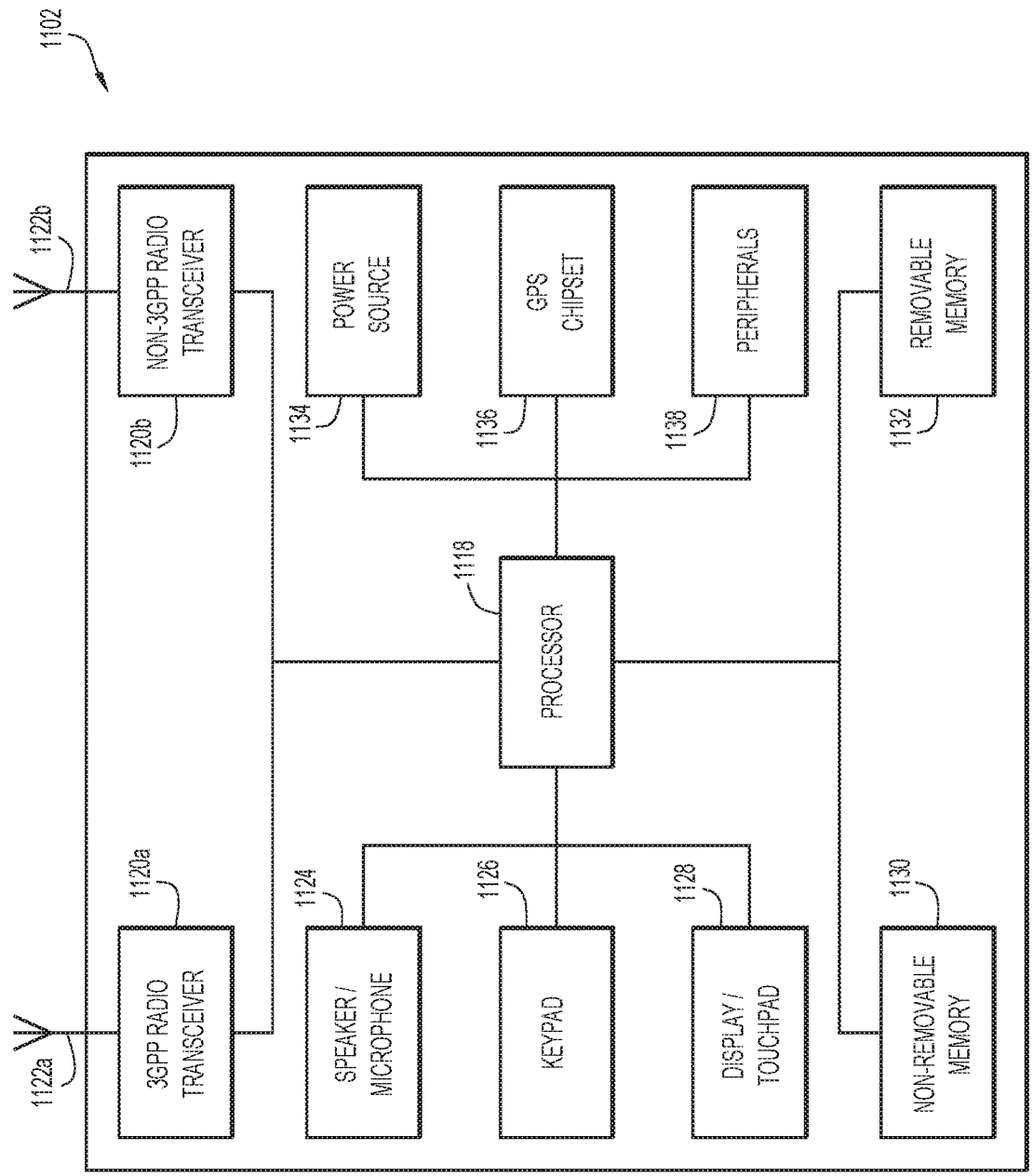
FIG. 11 is an example schematic block diagram of a UE according to some implementations.

Reference is now made to FIG. 11, which shows an example schematic block diagram of a UE 1102 according to some implementations. UE 1102 may be, for example, a cellular telephone, a smart phone, a tablet, a laptop computer, etc. As shown in FIG. 11, UE 1102 may include one or more processors 1118, a 3GPP radio transceiver 1120a having a transmit/receive element 1122a (e.g. CBRS LTE based transceiver), a non-3GPP radio transceiver 1120b (e.g. IEEE 802.11 STA) having a transmit/receive element 1122b, a speaker/microphone 1124, a keypad 1126, a display/touchpad 1128, non-removable memory 1130, removable memory 1132, a power source 1134, a global positioning system (GPS) chipset 1136, and other peripherals 1138. It will be appreciated that the UE 1102 may include any sub-combination of the foregoing elements while remaining consistent with an embodiment.

Processor 1118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 1118 may perform signal coding, data processing, power control, input/output processing, and/or any other functionality that enables UE 1102 to operate in a wireless environment.

Processor 1118 may be coupled to 3GPP radio transceiver 1120a (e.g. CBRS private LTE), which may be coupled to the transmit/receive element 1122a. Processor 1118 may also be coupled to non-3GPP radio transceiver 1120b (e.g. Wi-Fi), which may be coupled to the transmit/receive element 1122b. While FIG. 11 depicts the processor 1118 and transceivers 1120a and 1120b as separate components, it will be appreciated that the processor 1118 and transceivers 1120a and/or 1120b may be integrated together in an electronic package or chip. Transmit/receive element 1122a may be configured to transmit signals to, or receive signals from, a base station over an air interface. For example, in one embodiment, transmit/receive element 1122a may be an antenna configured to transmit and/or receive RF signals using 3GPP radio transceiver 1120a. The 3GPP radio transceiver 1120a may be configured to modulate the signals that are to be transmitted by transmit/receive element 1122a and to demodulate the signals that are received by transmit/receive element 1122a. In preferred implementations, UE 1102 may operate transceiver 1120a according to Dual SIM Dual Standby or DSDS. Transmit/receive element 1122b may be configured to transmit signals to, or receive signals from, an access point over an air interface. For example, in one embodiment, transmit/receive element 1122*b* may be an antenna configured to transmit and/or receive RF signals using non-3GPP radio transceiver 1120*b*. The non-3GPP radio transceiver 1120*b* may be configured to modulate the signals that are to be transmitted by transmit/receive element 1122*b* and to demodulate the signals that are received by transmit/receive element 1122*b*.

Processor 1118 of UE 1102 may be coupled to, and may receive user input data from, speaker/microphone 1124, keypad 1126, and/or di splay/touchpad 1128 (e.g., a liquid crystal display (LCD) display unit or organic light-emitting diode (OLED) display unit). Processor 1118 may also output user data to speaker/microphone 1124, keypad 1126, and/or display/touchpad 1128. In addition, processor 1118 may access information from, and store data in, any type of suitable memory, such as non-removable memory 1130 and/or removable memory 1132. Non-removable memory 1130 may include random-access memory (RAM), read-only memory (ROM), a hard disk, or any other type of memory storage device. The removable memory 1132 may include a SIM card, a memory stick, a secure digital (SD) memory card, and the like. In other embodiments, processor 1118 may access information from, and store data in, memory that is not physically located on UE 1102, such as on a server or a home computer (not shown).

Processor 1118 may also be coupled to GPS chipset 1136, which may be configured to provide location information (e.g., longitude and latitude) regarding the current location of UE 1102. In addition to, or in lieu of, the information from the GPS chipset 1136, UE 1102 may receive location information over an air interface from a base station and/or determine its location based on the timing of the signals being received from two or more nearby base stations.

Processor 1118 may further be coupled to other peripherals 1138, which may include one or more software and/or hardware modules that provide additional features, functionality and/or wired or wireless connectivity. For example, peripherals 1138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Processor 1118 may receive power from power source 1134, and may be configured to distribute and/or control the power to the other components in the UE 1102. Power source 1134 may be any suitable device for powering UE 1102. For example, power source 1134 may include one or more dry cell batteries, solar cells, fuel cells, and the like.

Figure 12:
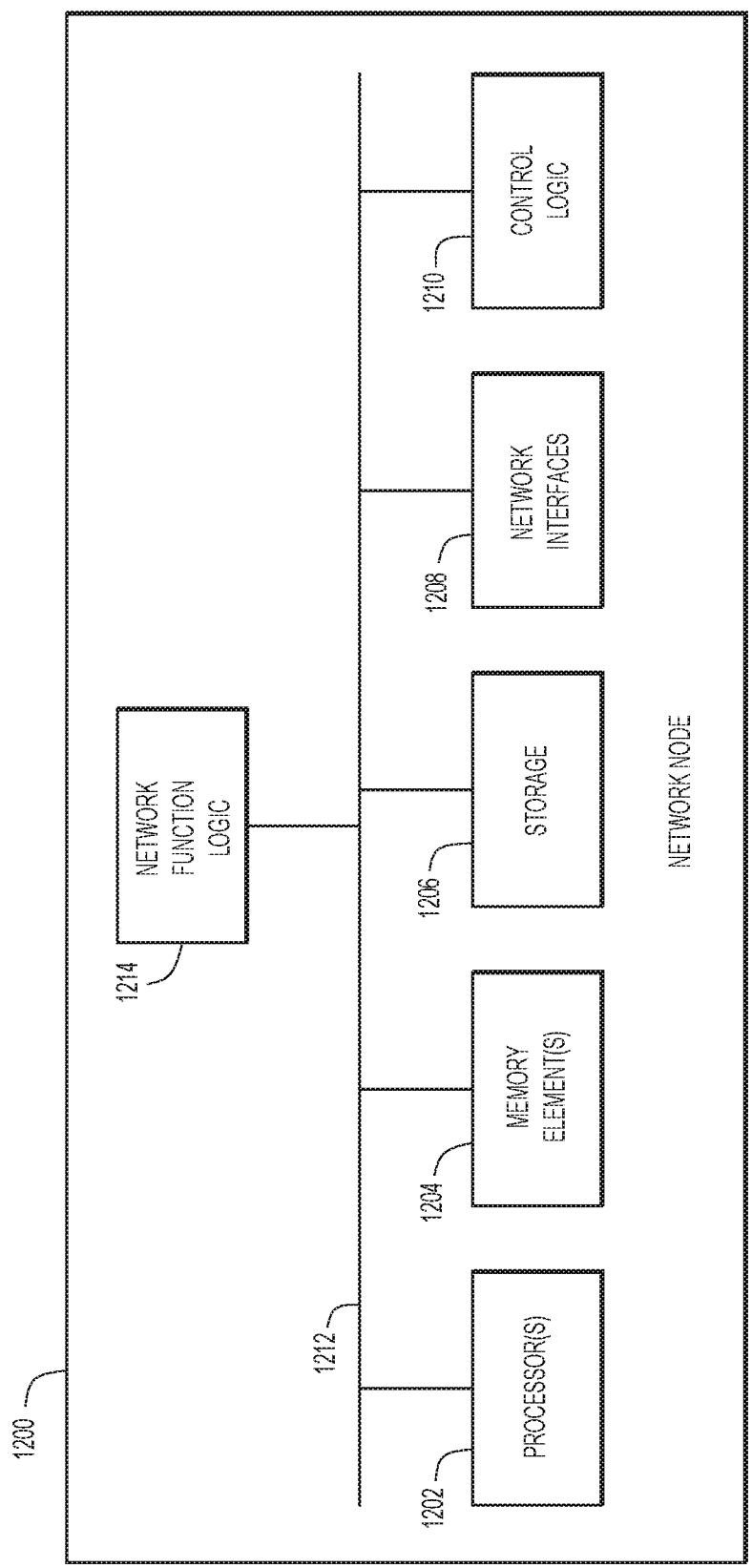
FIG. 12 is a simplified block diagram of a network node which may be or include a controller or network function operative according to some implementations.

FIG. 12 is a simplified block diagram of a network node 1200 which may be a controller or network function operative according to some implementations. Such network node 1200 may be used as a controller or network function in a communication system, network, controller, access point, or base station, according to the techniques described earlier above. Network node 1200 may embody a control plane function for non-3GPP access and/or a control plane function for 3GPP access as described above in relation to the previous figures (see e.g. FIGS. 4A-4B). In some implementations, network node 1200 may include one or more processors 1202, one or more memory elements 1204, storage 1206, network interfaces 1208, control logic 1210 and network function logic 1214. In some implementations, the processor 1202 may be or include at least one hardware processor configured to execute various tasks, operations and/or functions for network node 1200 as described herein according to software and/or instructions configured for the network node 1200. In some implementations, memory element 1204 and/or storage 1206 are configured to store data, information, software, instructions, logic (e.g. any logic 1210 and/or 1214), data structures, combinations thereof, or the like for various embodiments described herein. Note that in some implementations, storage may be consolidated with memory element (or vice versa), or may overlap/exist in any other suitable manner.

In some implementations, network interfaces 1208 enable communication between for network node 1200 and other network elements, systems, slices, etc. that may be present in the system to facilitate operations as discussed for various embodiments described herein. In some implementations, network interfaces 1208 may include one or more Ethernet drivers and/or controllers, Fiber Channel drivers, and/or controllers, or other similar network interface drivers and/or controllers to enable communications for network node 1200 within the system.

In some implementations, control logic 1210 may include instructions that, when executed (e.g. via processor 1202), cause for network node 1200 to perform operations, which may include, but not be limited to, providing overall control operations of network node 1200; cooperating with other logic, data structures, etc. provisioned for and/or maintained by network node 1200; combinations thereof; or the like to facilitate various operations as discussed for various embodiments described herein.

In some implementations, bus 1212 may be configured as an interface that enables one or more elements of network node 1200 (e.g. processor 1202, memory element 1204, logic, etc.) to communicate in order to exchange information and/or data. In at least one embodiment, bus 1212 may be implemented as a fast kernel-hosted interconnect, potentially using shared memory between processes (e.g. logic, etc.), which may enable efficient communication paths between the processes. In some implementations, network function logic 1214 may include instructions that, when executed (e.g. via one or more processor 1202) cause network node 1200 to perform one or more operations for one or more network elements as discussed for various implementations described herein.

In some implementations, each of the elements of the system may couple to one another through simple interfaces or through any other suitable connection (wired or wireless), which provides a viable pathway for network communications. As referred to herein, a physical (wired or wireless) interconnection or interface may refer to an interconnection of one element or node with one or more other element(s), while a logical interconnection or interface may refer to communications, interactions and/or operations of elements with each other, which may be directly or indirectly interconnected, in a network environment.

Note that the terms 'data', 'information', 'parameters' and variations thereof as used herein may refer to any type of binary, numeric, voice, video, textual or script data or information or any type of source or object code, or any other suitable data or information in any appropriate format that may be communicated from one point to another in electronic devices and/or networks. Additionally, messages, requests, responses, replies, queries, etc. are forms of network traffic and, therefore, may comprise one or more packets.

The terms 'UE', 'mobile device,' 'mobile radio device,' 'end device,', 'user', 'subscriber' or variations thereof may be used interchangeably and are inclusive of devices used to communicate, such as a computer, an electronic device such as an Internet of Things (IoT) device (e.g. an appliance, a thermostat, a sensor, a parking meter, etc.), a personal digital assistant (PDA), a laptop or electronic notebook, a cellular telephone, an IP phone, an electronic device having cellular and/or Wi-Fi connection capabilities, a wearable electronic device, or any other device, component, element, or object capable of initiating voice, audio, video, media, or data exchanges within the system. A UE may also be inclusive of a suitable interface to a human user such as a microphone, a display, a keyboard, or other terminal equipment.

Note that in some implementations, operations as outlined herein to facilitate techniques of the present disclosure may be implemented by logic encoded in one or more tangible media, which may be inclusive of non-transitory tangible media and/or non-transitory computer readable storage media (e.g. embedded logic provided in an ASIC, in DSP instructions, software—potentially inclusive of object code and source code—to be executed by a processor, or other similar machine, etc.). In some of these instances, a memory element and/or storage may store data, software, code, instructions (e.g. processor instructions), logic, parameters, combinations thereof or the like used for operations described herein. This includes memory element and/or storage being able to store data, software, code, instructions (e.g. processor instructions), logic, parameters, combinations thereof, or the like that are executed to carry out operations described herein.

A processor (e.g. a hardware processor) may execute any type of instructions associated with data to achieve the operations detailed herein. In one example, a processor may transform an element or an article (e.g. data, information) from one state or thing to another state or thing. In another example, operations outlined herein may be implemented with logic, which may include fixed logic, hardware logic, programmable logic, digital logic, etc. (e.g. software/instructions executed by a processor), and/or one or more the elements identified herein could be some type of a programmable processor, programmable digital logic (e.g. a field programmable gate array (FPGA), a DSP processor, an EPROM, a controller, an electrically erasable PROM (EEPROM), or an ASIC) that includes digital logic, software, code, electronic instructions, or any suitable combination thereof.

It is also noted that the operations and steps described with reference to the preceding figures illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that the system (and its teachings) are readily scalable and may accommodate a large number of components, as well as more complicated/sophisticated arrangements and configurations. Accordingly, the examples provided should not limit the scope or inhibit the broad teachings of the system as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, the system may be applicable to other exchanges or routing protocols, interfaces, and/or communications standards, proprietary, and/or non-proprietary. Moreover, although the system has been illustrated with reference to particular elements and operations that facilitate the communication process, these elements, and operations may be replaced by any suitable architecture or process that achieves the intended functionality of the system.

Although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

It will also be understood that, although the terms "first," "second," etc. may be used herein to describe various elements, these elements should not be limited by these terms. These terms are used to distinguish one element from another. For example, a first authentication procedures could be termed a second authentication procedure, and similarly, a second authentication procedure could be termed a first authentication procedure, without changing the meaning of the description, so long as all occurrences of the "first authentication procedure" are renamed consistently and all occurrences of the "second authentication procedure" are renamed consistently. The first authentication procedure and the second authentication procedure are both authentication procedures, but they are not the same authentication procedure.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method for use in providing authentication and security in a private communication system having a control plane function for non-Third Generation Partnership Project (non-3GPP) access for controlling non-3GPP access to the private communication system via one or more non-3GPP access points (APs) of the private communication system and a control plane function for 3GPP access for controlling 3GPP access to the private communication system via one or more 3GPP base stations of the private communication system, the method comprising:
 at the control plane function for non-3GPP access to the private communication system,
  serving as an authenticator in an authentication procedure for authenticating a user equipment (UE) for the non-3GPP access to the private communication system;
  obtaining a master key from the authentication procedure for the non-3GPP access to the private communication system;
  deriving, based on the master key, one or more non-3GPP-type security keys for securing communications for the UE for the non-3GPP access to the private communication system;
 at the control plane function for 3GPP access to the private communication system,
  based on an indication indicating authentication of the UE in the authentication procedure for the non-3GPP access to the private communication system, permitting the 3GPP access to the private communication system for the UE;
  receiving, from the control plane function for non-3GPP access, the master key obtained from the authentication procedure for the non-3GPP access to the private communication system;
  deriving, based on the master key, an Access Security Management Entity (ASME) key ($K_{ASME}$); and
  deriving, based on the $K_{ASME}$, one or more 3GPP-type security keys for securing communications for the UE for the 3GPP access to the private communication system.

2. The method of claim 1, wherein:
 the private communication system includes a local private non-3GPP wireless network and a local private 3GPP network, or a local private integrated non-3GPP and 3GPP network, and
 the non-3GPP access to the private communication system comprises an IEEE 802.11 compliant network access and the 3GPP access to the private communication system comprises a Fourth Generation (4G) Long-Term Evolution (LTE) network access or a Fifth Generation (5G) network access.

3. The method of claim 1, wherein:
 serving as the authenticator in the authentication procedure comprises serving as a first authenticator in a first authentication procedure for authenticating the UE for the non-3GPP access to the private communication system,
 the control plane function for 3GPP access is operative to serve as a second authenticator in a second authentication procedure for the 3GPP access to the private communication system, and
 permitting the 3GPP access to the private communication system for the UE includes bypassing at least part of the second authentication procedure for the UE for the 3GPP access to the private communication system.

4. The method of claim 1, wherein:
 serving as the authenticator in the authentication procedure comprises serving as a first authenticator in a first authentication procedure for authenticating the UE for the non-3GPP access to the private communication system,
 the control plane function for 3GPP access is operative to serve as a second authenticator in a second authentication procedure for the 3GPP access to the private communication system, the method further comprising:
 the method further comprises, at the control plane function for 3GPP access,
  receiving an indication;
  based on identifying a first value of the indication, serving as the second authenticator in in the second authentication procedure for the UE for the 3GPP access to the private communication system; and
  based on identifying a second value of the indication, permitting the 3GPP access to the private communication system for the UE by bypassing at least part of the second authentication procedure for the UE for the 3GPP access to the private communication system.

5. The method of claim 4, further comprising:
 at the control plane function for 3GPP access,
  receiving, from the UE via a 3GPP base station, a message indicating an attach request for registration, the message further including the indication.

6. The method of claim 1, further comprising:
 at the control plane function for non-3GPP access,
  sending, via the one or more non-3GPP APs of the private communication system, a beacon message including an indicator,
  wherein the indicator is set at a first value when the private communication system is configured without support of 3GPP access to the private communication system based on the authentication procedure for non-3GPP access, and
  wherein the indicator is set at a second value when the private communication system is configured with support of the 3GPP access to the private communication system based on the authentication procedure for non-3GPP access.

7. The method of claim 1, wherein the master key comprises a Master Session Key (MSK) and deriving the $K_{ASME}$ is based on a relation:

$$K_{ASME} = \text{hash}(MSK|SN\text{-}ID),$$

and wherein the SN-ID is a serving network ID associated with the private communication system.

8. The method of claim 7, wherein:

$$SN\text{-}ID = PLMN\ ID + CBRS\ NID,$$

wherein the PLMN ID is a Public Land Mobile Network (PLMN ID), and
 wherein the CBRS NID is a Citizens Broadband Radio Service (CBRS) Network ID (NID) which is or is based on a Closed Subscribers Group (CSG) ID.

9. The method of claim 1, wherein deriving, based on the $K_{ASME}$, the one or more 3GPP-type security keys comprises deriving, based on the $K_{ASME}$, at least one of access stratum (AS) security keys and non-access stratum (NAS) keys for securing communications for the UE.

10. The method of claim 1, further comprising:
at the control plane function for non-3GPP access,
sending, to the UE via one of the one or more non-3GPP APs of the private communication system, a message including a Globally Unique Temporary ID (GUTI), for use by the UE for the 3GPP access to the private communication system.

11. The method of claim 1, wherein:
the control plane function for 3GPP access is operative to serve as an authenticator in an Evolved Packet System (EPS) Authentication and Key Agreement (AKA) (EPS-AKA) authentication procedure,
permitting the 3GPP access to the private communication system for the UE includes bypassing the EPS-AKA authentication procedure for the UE for the 3GPP access to the private communication system, and
serving as the authenticator in the authentication procedure for the UE further comprises serving as the authenticator in an Extensible Authentication Procedure (EAP) authentication procedure for the UE for the non-3GPP access to the private communication system, obtaining the master key comprises obtaining a Master Session Key (MSK), and deriving the one or more non-3GPP-type security keys comprises deriving a Pairwise Master Key (PMK), a Pairwise Transfer Key (PTK), a Group Master Key (GMK), a Group Temporal Key (GTK), or combinations thereof, or
serving as the authenticator in the authentication procedure for the UE further comprises serving as the authenticator in Pre-Shared Key (PSK) authentication procedure for the UE for the non-3GPP access to the private communication system, obtaining the master key comprises obtaining a PSK, and deriving the one or more non-3GPP-type security keys comprises deriving a PMK, a PTK, a GMK, a GTK, or combinations thereof.

12. A network node comprising:
one or more processors;
memory for storing instructions of a control plane function for Third Generation Partnership Project (3GPP) access for controlling 3GPP access to a private communication system;
an interface to communicate with a control plane function for non-3GPP access, wherein the control plane function for non-3GPP access is for controlling non-3GPP access to the private communication system by serving as an authenticator in an authentication procedure for authenticating a user equipment (UE) for the non-3GPP access to the private communication system; obtaining a master key from the authentication procedure for the non-3GPP access to the private communication system; and deriving, based on the master key, one or more non-3GPP-type security keys for securing communications for the UE for the non-3GPP access to the private communication system;
the one or more processors being operative to execute the instructions of the control plane function for 3GPP access for:
permitting the 3GPP access to the private communication system for the UE based on an indication indicating authentication of the UE in the authentication procedure for the non-3GPP access to the private communication system;
receiving, from the control plane function for non-3GPP access, the master key obtained from the authentication procedure for the non-3GPP access to the private communication system;
deriving, based on the master key, an Access Security Management Entity (ASME) key ($K_{ASME}$); and
deriving, based on the $K_{ASME}$, one or more 3GPP-type security keys for securing communications for the UE.

13. The network node of claim 12, wherein the control plane function for non-3GPP access is for controlling the non-3GPP access to the private communication system further by serving as the authenticator in the authentication procedure for the UE by serving as an authenticator in an Extensible Authentication Procedure (EAP) authentication procedure for the UE for the non-3GPP access to the private communication system, obtaining the master key by obtaining a Master Session Key (MSK), and deriving the one or more non-3GPP-type security keys by deriving a Pairwise Master Key (PMK), a Pairwise Transfer Key (PTK), a Group Master Key (GMK), a Group Temporal Key (GTK), or combinations thereof, and wherein:
the control plane function for 3GPP access is operative to serve as an authenticator in an Evolved Packet System (EPS) Authentication and Key Agreement (AKA) (EPS-AKA) authentication procedure for the 3GPP access to the private communication system, and
the one or more processors are operative to execute the instructions of the control plane function for 3GPP access for permitting the 3GPP access to the private communication system for the UE including bypassing the EPS-AKA authentication procedure for the UE for the 3GPP access to the private communication system.

14. The network node of claim 12, wherein the master key comprises a Master Session Key (MSK), and the one or more processors are operative to execute the instructions of the control plane function for 3GPP access further by deriving the $K_{ASME}$ based on a relation:

$$K_{ASME}=\text{hash}(MSK|SN\text{-}ID),$$

wherein the SN-ID is a serving network ID.

15. The network node of claim 12, wherein the one or more processors are operative to execute the instructions of the control plane function for 3GPP access further for:
sending, to the UE, a message including a Globally Unique Temporary ID (GUTI), for use by the UE for the 3GPP access to the private communication system.

16. A method of a user equipment (UE) for communicating in a private communication system having non-Third Generation Partnership Project (non-3GPP) access via one or more non-3GPP access points (APs) of the private communication system and 3GPP access via one or more 3GPP base stations of the private communication system, the method comprising:
at a control plane function for non-3GPP access associated with a non-3GPP radio transceiver,
operating as a supplicant in an authentication procedure for authenticating the UE for the non-3GPP access to the private communication system;
generating a master key from the authentication procedure for the non-3GPP access to the private communication system;
deriving, based on the master key, one or more non-3GPP-type security keys for securing communications for the UE for the non-3GPP access to the private communication system;
at a control plane function for 3GPP access associated with a 3GPP radio transceiver,
receiving, from the control plane function for non-3GPP access, the master key generated from the authentication procedure for the non-3GPP access to the private communication system;

deriving, based on the master key, an Access Security Management Entity (ASME) key ($K_{ASME}$); and deriving, based on the $K_{ASME}$, one or more 3GPP-type security keys for securing communications for the UE for the 3GPP access to the private communication system.

17. The method of claim 16, wherein the private communication system includes a local private non-3GPP wireless network and a local private 3GPP network operative according to a system for shared spectrum access, or a local private integrated non-3GPP and 3GPP network, the method further comprising:

at the control plane function for 3GPP access,
based on an indication indicating authentication of the UE in the authentication procedure for the non-3GPP access to the private communication system, bypassing an Evolved Packet System (EPS) Authentication and Key Agreement (AKA) (EPS-AKA) procedure for the UE for the 3GPP access to the private communication system.

18. The method of claim 16, wherein operating as the supplicant in the authentication procedure comprises operating as the supplicant in a first authentication procedure for authenticating the UE for the non-3GPP access to the private communication system, the method further comprising:

at the control plane function for non-3GPP access,
receiving, via the one or more non-3GPP APs of the private communication system, a beacon message including an indicator;

at the control plane function for 3GPP access,
participating in a second authentication procedure for the UE for the 3GPP access to the private communication system, based on the indicator being set at a first value indicating that the private communication system is operative without support of the 3GPP access to the private communication system based on the authentication procedure for the non-3GPP access to the private communication system; and bypassing the second authentication procedure for the UE for the 3GPP access to the private communication system, based on the indicator being set at a second value indicating that the private communication system is operative to support the 3GPP access to the private communication system based on the authentication procedure for the non-3GPP access to the private communication system.

19. The method of claim 16, wherein the master key comprises a Master Session Key (MSK) and deriving the $K_{ASME}$ is based on a relation:

$K_{ASME}$=hash(MSK|SN-ID), wherein the SN-ID is a serving network ID.

20. The method of claim 16, further comprising:
at the control plane function for non-3GPP access,
receiving, from one of the one or more non-3GPP APs of the private communication system, a message including a Globally Unique Temporary ID (GUTI) of the UE;

at the control plane function for 3GPP access,
sending, to one of the 3GPP base stations of the private communication system, a message indicating an attach request for registration, the message including the GUTI of the UE.

21. A method for communicating in a private communication system by a user equipment (UE) having a non-Third Generation Partnership Project (non-3GPP) radio transceiver for non-3GPP access via one or more non-3GPP access points (APs) of the private communication system and a 3GPP radio transceiver for 3GPP access via one or more 3GPP base stations of the private communication system, the method comprising:

at a control plane function for 3GPP access,
interfacing for communication with a control plane function for non-3GPP access associated with the non-3GPP radio transceiver, configured for operating as a supplicant in an authentication procedure for authenticating the UE for the non-3GPP access to the private communication system, generating a master key from the authentication procedure for the non-3GPP access to the private communication system, and deriving, based on the master key, one or more non-3GPP-type security keys for securing communications for the UE for the non-3GPP access to the private communication system;

bypassing an authentication procedure for authentication of the UE for the 3GPP access to the private communication system;

receiving, from the control plane function for non-3GPP access, the master key generated from the authentication procedure for the non-3GPP access to the private communication system;

deriving, based on the master key, an Access Security Management Entity (ASME) key ($K_{ASME}$); and deriving, based on the $K_{ASME}$, one or more 3GPP-type security keys for securing communications for the UE for the 3GPP access to the private communication system.

* * * * *